(12) United States Patent
Sugiyama et al.

(10) Patent No.: US 10,496,226 B2
(45) Date of Patent: Dec. 3, 2019

(54) OPTICAL SENSING UNIT AND TOUCH PANEL DEVICE INCLUDING THE SAME

(71) Applicant: Sharp Kabushiki Kaisha, Sakai, Osaka (JP)

(72) Inventors: Koichi Sugiyama, Sakai (JP); Nobuyuki Yoshioka, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 174 days.

(21) Appl. No.: 15/540,265

(22) PCT Filed: Nov. 9, 2015

(86) PCT No.: PCT/JP2015/081493
§ 371 (c)(1),
(2) Date: Jun. 28, 2017

(87) PCT Pub. No.: WO2016/111084
PCT Pub. Date: Jul. 14, 2016

(65) Prior Publication Data
US 2018/0004356 A1    Jan. 4, 2018

(30) Foreign Application Priority Data

Jan. 8, 2015 (JP) ................................. 2015-002374
Jan. 8, 2015 (JP) ................................. 2015-002375

(51) Int. Cl.
*G06F 3/042* (2006.01)
*F21V 8/00* (2006.01)

(52) U.S. Cl.
CPC ........... *G06F 3/0421* (2013.01); *G02B 6/005* (2013.01); *G02B 6/0016* (2013.01); *G02B 6/0045* (2013.01); *G02B 6/0065* (2013.01)

(58) Field of Classification Search
None
See application file for complete search history.

(56) References Cited

U.S. PATENT DOCUMENTS

2005/0073508 A1    4/2005  Pittel et al.
2007/0201042 A1*   8/2007  Eliasson ............... G06F 3/0386
                                                      356/614

(Continued)

FOREIGN PATENT DOCUMENTS

JP    2003-515800 A    5/2003
JP    2009-258967 A    11/2009

(Continued)

OTHER PUBLICATIONS

Official Communication issued in International Patent Application No. PCT/JP2015/081493, dated Jan. 26, 2016.

*Primary Examiner* — Christopher R Lamb
(74) *Attorney, Agent, or Firm* — Keating & Bennett, LLP

(57) ABSTRACT

Provided is an optical sensing member, comprising a light guide plate 102 which propagates light from a light source unit 108, detecting units 104, 106 which detect scattered light from the light guide plate 102 being touched, an optical member which guides the scattered light to the detecting units, and a primary control unit 118 which computes the touch location upon the light guide plate 102 on the basis of information relating to the detected light. The optical member has arc-shaped curved surfaces formed on the end parts which face each of the detecting units. Each of the detecting units outputs, as the information relating to the light which is detected by the detecting units, location information corresponding to the angle of entry to the detecting units of the light which is radiated from the facing arc-shaped curved surfaces. It is thus possible to clarify contours of the light which is detected by the detecting units, and to improve the precision of the detection of the touch location.

14 Claims, 31 Drawing Sheets

(56) References Cited

U.S. PATENT DOCUMENTS

| | | | | |
|---|---|---|---|---|
| 2011/0122091 A1* | 5/2011 | King | ............... | G06F 3/0421 |
| | | | | 345/175 |
| 2013/0155027 A1 | 6/2013 | Holmgren et al. | | |
| 2013/0321345 A1* | 12/2013 | Burns | ............... | G06F 3/042 |
| | | | | 345/175 |

FOREIGN PATENT DOCUMENTS

| | | | |
|---|---|---|---|
| JP | 2014-513375 A | 5/2014 | |
| WO | 2013/138003 A1 | 9/2013 | |

* cited by examiner

Fig.31
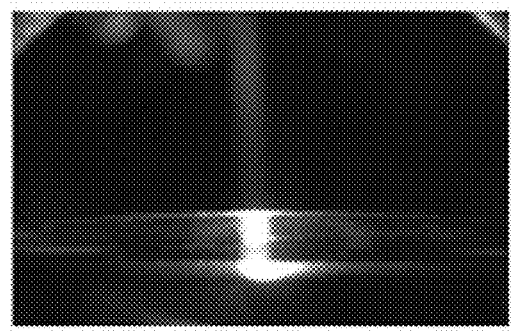
(a)
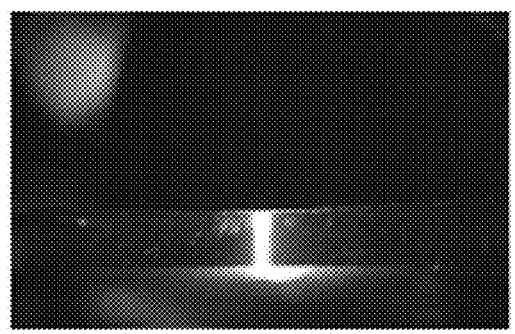
(b)
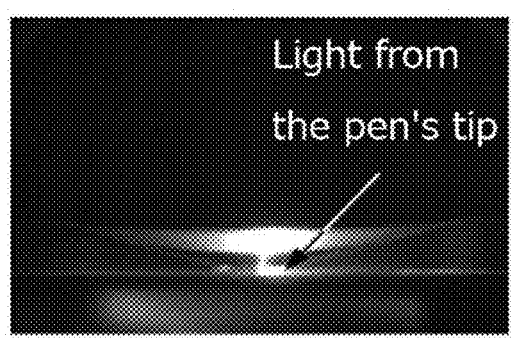
(c)

OPTICAL SENSING UNIT AND TOUCH PANEL DEVICE INCLUDING THE SAME

BACKGROUND OF THE INVENTION

Field of the Invention

The present invention relates to an optical sensing unit and a touch panel device of a Frustrated Total Internal Reflection (FTIR) type including the same, and more particularly to an optical sensing unit for increasing the strength of detection light detected by a detecting member and producing the detection light of which the contour is clarified to improve the detection precision of a touch location, and a touch panel device including the same.

Description of the Related Art

As an optical touch panel, a touch panel device of the Frustrated Total Internal Reflection (FTIR) type has been known in which a light source unit and a detection sensor are provided on a side wall of a light guide plate arranged on a display device including a liquid crystal display or the like. This touch panel detects a touch location upon the touch panel as follows. The light is irradiated from the side wall of the light guide plate. When a finger or pen is touched to the surface of the light guide plate, the light propagating through the light guide plate is scattered. This scattered light is detected by a detection sensor to detect the touch location.

For example, in Patent Document 1, there is disclosed an invention for providing a touch panel device for improving the detection precision of the touch location by reducing the influence of an external light (ambient light). This type of touch panel device comprises a light source for entering the light to the light guide plate; a receiving element arranged on a portion of the side of the light guide plate; and an image focusing means (lens) positioned between the side of light guide plate and the receiving element for focusing the light which is scattered by a detection object (finger or input pen) into the receiving element. The image focusing means and the receiving element are obliquely arranged to the rectangular side of the light guide plate. The light guide plate is formed as a flat which is obliquely cut, such that the corner at which the image focusing means is positioned is confronted with the image focusing means. In addition, in Patent Document 1, there is disclosed a configuration that a light absorption means (resin containing carbon black) is positioned on a part of the side of the light guide plate on which the light receiving element is arranged, and the light receiving element is arranged out of a region of radiating the light source.

Further, in Patent Document 2, there is disclosed a technique that the receiving element is arranged below a cover glass (light guide plate) so that the propagating and scattering light which is of total reflection by the cover glass is detected to detect the touch location on the cover glass. Specifically, an emitter (light source LED) is arranged close to one end of the cover glass and at the rear side of the cover glass. The light propagated from the emitter is incident on the inside of the cover glass from the rear side of the cover glass through an emitter lens. The incident light is propagated into the other end of the cover glass due to total reflection by the cover glass and emitted from the rear side of the cover glass. The emitted light is incident on a receiver through a receiver lens. The emitter lens and the receiver lens are adhered to the light guide plate by an adhesive.

RELATED ART

Patent Document

Patent Document 1: Japanese Unexamined Patent Application Publication No. 2009-258967
Patent Document 2: Japanese Unexamined Patent Application Publication (Translation of PCT Application) No. 2014-513375

SUMMARY OF THE INVENTION

Problems that the Invention is to Solve

However, the touch panel device disclosed in Patent Document 1 has the following problems. In this type of touch panel device, the shape of the light guide plate facing the light receiving unit including the light receiving element and the image focusing means is parallel with and flat with the light receiving unit. Accordingly, when the scattered light from the detection object reaches the edge surfaces of the light guide plate, the scattered light may be enlarged and the scattered light pattern may be vague. Even if the image focusing means is operated to focus the scattered light pattern onto the light receiving element, the contour of a pattern focused onto the light receiving element may be unclear. Therefore, there is a problem that it is impossible to detect the touch location, precisely.

To solve this problem, it is considered that, in order to enter a sharp scattered pattern onto the light receiving unit, edges of the light guide plate facing the light receiving unit are worked as an appropriate shape. If the light guide plate is made of a resin, the workability (cutting) may be high so that it may be possible to apply this way. However, if the light guide plate is made of a material which has low workability, it may be difficult to apply such a way. For example, acrylic resin has a low heat-resistant temperature and is combustible, it is desired to make the light guide plate of a glass or heat-resistant glass. In such a case, the workability of the glass is extremely low and it is impossible to work the appropriate shape of the light guide plate, so that the manufacturing cost may be high. Even if the light guide plate is made of a resin, it may be difficult to make a large size of the light guide plate because of the workability, so that the manufacturing cost may be high.

Although the technique disclosed in Patent Document 2 can be applied to the light guide plate of glass, the problem is that the structure is complex.

Accordingly, it is an object of the present invention to provide an optical sensing unit for increasing the strength of detection light detected by a detecting member and producing the detection light of which the contour is clarified to improve the detection precision of a touch location, and a touch panel device of a Frustrated Total Internal Reflection (FTIR) type comprising the same.

Means of Solving the Problems

According to a first aspect of the present invention, an optical sensing unit includes a detecting member for detecting light; and a flat optical member for guiding to the detecting member scattered light or incoming light, the scattered light occurring from light transmitted inside a flat light guide unit, and the scattered light starting being transmitted inside the light guide unit and propagating through the light guide unit when a first input object touches a surface of the light guide unit where the light is transmitted therein; and the incoming light occurring when a second input object touches the surface of the light guide unit and emits light, and coming into the light guide unit. The optical member has an arc-shaped curved surface in a section and the arc-shaped curved surface faces the detecting member. The detecting member outputs, as information relating to the light which is detected by the detecting member, location information of the first or second input object corresponding to an incident angle on the detecting member of the light which is radiated from the facing arc-shaped curved surface.

Then, the contour of the light radiated from the arc-shaped curved surface and detected by the detecting member can be clarified. Therefore, the precision of the touch location corresponding to the incident angle on the detecting member can be also improved to thereby improve the detection precision of the touch location by the light guide unit.

Preferably, the arc-shaped curved surface has a first slope which is oblique to a flat plane of the optical member.

Then, the contour of the light radiated from the first slope and detected by the detecting member can be clarified. Therefore, the precision of the touch location corresponding to the incident angle on the detecting member can be improved to thereby improve the detection precision of the touch location by the light guide unit.

More preferably, an angle of inclination of the first slope to the flat plane of the optical member is 10° or more and 40° or less.

Then, the strength of the light incident on the detecting member can be further increased.

Most preferably, the detecting member includes a lens and a sensor. The lens is arranged to be separated from the arc-shaped curved surface. The lens is provided for guiding the light radiated from the arc-shaped curved surface to a position on the sensor corresponding to each of the incident angles of the light on the detecting member.

Then, the precision of the touch location corresponding to the incident angle on the detecting member can be improved to thereby improve the detection precision of the touch location by the light guide unit.

According to a second aspect of the present invention, a touch panel device includes, at least, a flat light guide unit for propagating light; at least two aforementioned optical sensing units respectively positioned to the edges of a rear surface of the light guide unit; and a computing unit for computing a touch location upon the light guide unit by the first or second input object on the basis of the information relating to the detected light.

Then, the contour of the light radiated from the arc-shaped curved surface of the optical sensing unit and detected by the detecting member can be clarified. Therefore, in the touch panel device, the precision of the touch location corresponding to the incident angle on the detecting member can be also improved to thereby improve the detection precision of the touch location by the light guide unit.

Preferably, the optical member is closely joined to the light guide unit.

Then, the light propagating through the light guide unit can be effectively entered to the optical member.

More preferably, the touch panel device further includes a first reflection material arranged on region on the surfaces of the light guide unit corresponding to the position of the optical member.

Then, the light propagating through the inside of the light guide unit is prevented from being detected by the detecting member and leaking outside of the light guide unit, so that the external light is prevented from being entered onto the light guide unit and being detected by the detecting member.

Most preferably, the touch panel device further includes a cover arranged to be separated from a rear surface of the optical member at the rear surface of the optical member.

Then, the light from the surrounding of the touch panel device, especially, the light from the rear surface of the touch panel device is prevented from entering into the detecting member.

According to a third aspect of the present invention, a touch panel device includes, at least, a flat light guide unit for propagating light; at least two aforementioned optical sensing units respectively positioned to the edges of the light guide unit; and a computing unit for computing a touch location upon the light guide unit by the first or second input object on the basis of the information relating to the light.

Then, the contour of the light radiated from the arc-shaped curved surface and detected by the detecting member can be clarified. Therefore, the precision of the touch location corresponding to the incident angle can be also improved to thereby improve the detection precision of the touch location by the light guide unit.

Preferably, the arc-shaped curved surface has a second slope which is oblique to a flat plane of the optical member.

Then, the contour of the light radiated from the second slope and detected by the detecting member can be clarified. Therefore, the precision of the touch location corresponding to the incident angle on the detecting member can be improved to thereby improve the detection precision of the touch location by the light guide unit.

More preferably, the touch panel device further includes a second reflection material arranged closed to the second slope for reflecting the light propagating through the inside of the light guide unit.

Then, the light is prevented from radiating from the second slope to the upper side of the light guide unit, so that the strength of the light incident on the detecting member can be increased.

Most preferably, the touch panel device further includes a third reflection material closely arranged facing to the second slope at a rear surface of the optical member for reflecting the light propagating through the inside of the light guide unit.

Then, the light is prevented from being radiated from the rear surface of the light guide unit, so that the strength of the light incident on the detecting member can be increased.

Preferably, the touch panel device further includes a second arc-shaped curved surface which is vertical to a rear surface of the optical member, positioned at the minimum distance between the second slope and the rear surface of the optical member and formed to be continuous with the second slope.

Then, the light propagating through the inside of the light guide unit can be radiated from the second arc-shaped curved surface and entered on the detecting member, so that the contour of the light detected by the detecting member can be clarified. Therefore, the precision of the touch location corresponding to the incident angle on the detecting member can be improved to thereby improve the detection precision of the touch location by the light guide unit.

More preferably, the touch panel device having the second arc-shaped curved surface further includes a fourth reflection material arranged closely to the entire surface of the second slope for reflecting the light propagating through the inside of the light guide unit.

Then, the light is prevented from being radiated from the second slope to the upper side of the light guide unit, so that the strength of the light incident on the detecting member can be increased.

Most preferably, the touch panel device having the second arc-shaped curved surface further includes a fifth reflection material closely arranged facing to the second slope at a rear surface of the optical member for reflecting the light propagating through the inside of the light guide unit.

Then, the light is prevented from being radiated from the rear surface of the light guide unit, so that the strength of the light incident on the detecting member can be increased.

Preferably, an angle of inclination of the second slope to the flat plane of the optical member is 10° or more and 40° or less.

Then, the strength of the light incident on the detecting member can be further increased.

Effect of the Invention

According to the present invention, the optical member is provided to be separated from the light guide unit, so that the light can be radiated from the arc-shaped curved surface or the slope of the optical member joined to the light guide unit without special working of the light guide unit, and the contour of the light detected by the detecting member can be clarified.

Further, according to the present invention, the light can be radiated from the arc-shaped curved surface or the slope of the light guide unit and detected by the detecting member, so that the contour of the light can be clarified.

Therefore, the precision of the touch location corresponding to the incident angle on the detecting member can be improved to thereby improve the detection precision of the touch location on the light guide unit.

BRIEF DESCRIPTION OF THE DRAWINGS

FIG. 31 is a photograph showing an experimental result.

BEST MODE FOR CARRYING OUT THE INVENTION

In the preferred embodiments of the present invention as mentioned below, like elements are denoted by like reference numbers. These names and functions are the same. Therefore, no detailed description of these like elements is repeated, hereinafter.

According to an optical sensing unit of the present invention, in order to increase the strength of a detection light detected by a detecting member and produce a clarified contour of the detection light, a light guide plate or a member different from the light guide plate is provided with an arc-shaped curved surface, in which the arc-shaped curved surface faces the detecting member.

First Embodiment

Figure 1:
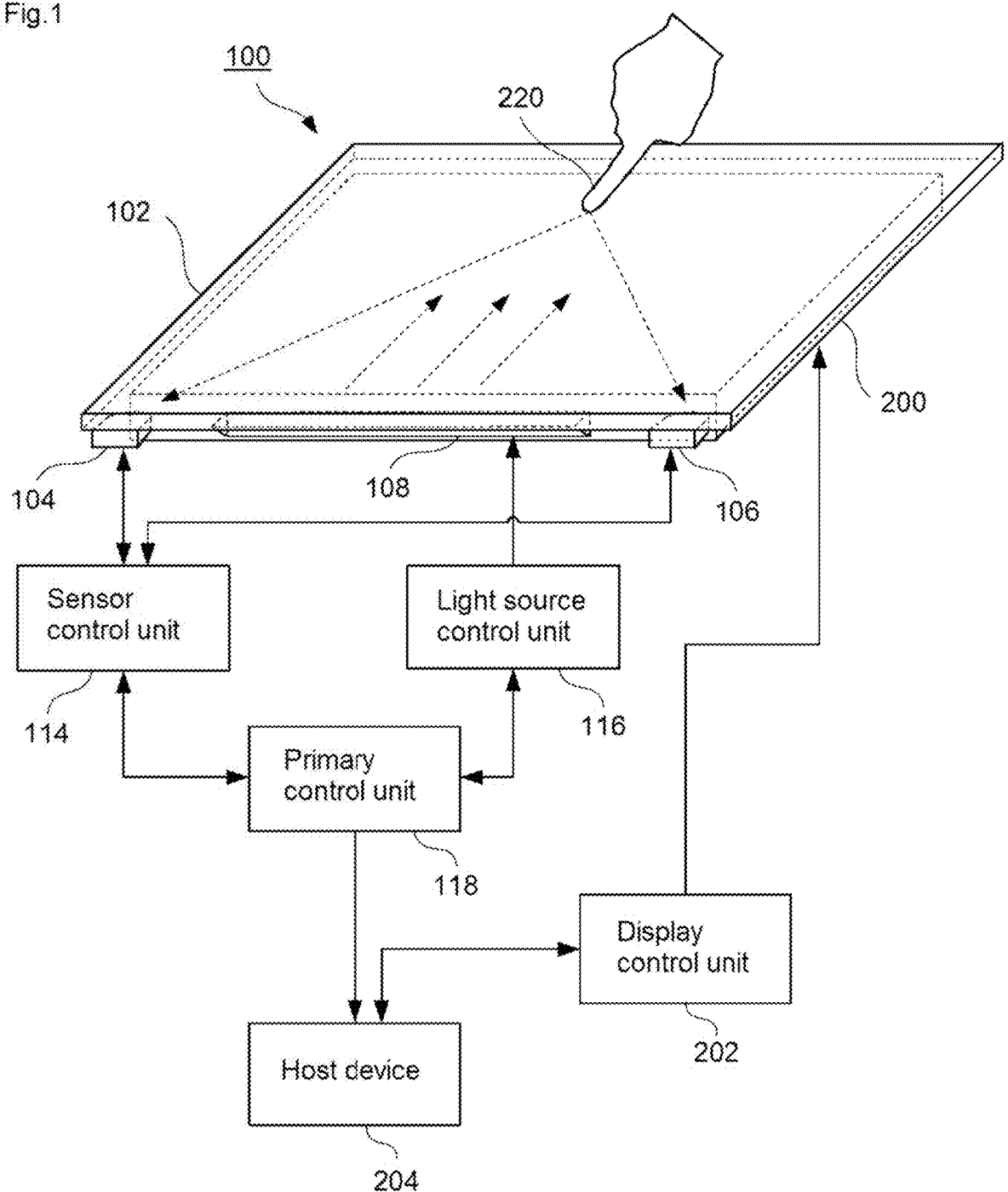
FIG. 1 is a schematic configuration diagram of a touch panel device according to a first embodiment of the present invention.

With reference to FIG. 1, a touch panel device 100 according to a first embodiment of the present invention comprises a light guide plate 102, a first sensor unit 104, a second sensor unit 106, a light source unit 108, a sensor control unit 114, a light source control unit 116, and a primary control unit 118. The light guide plate 102 is made of glass, e.g. borosilicate glass (heat-resistant glass).

Figure 2:
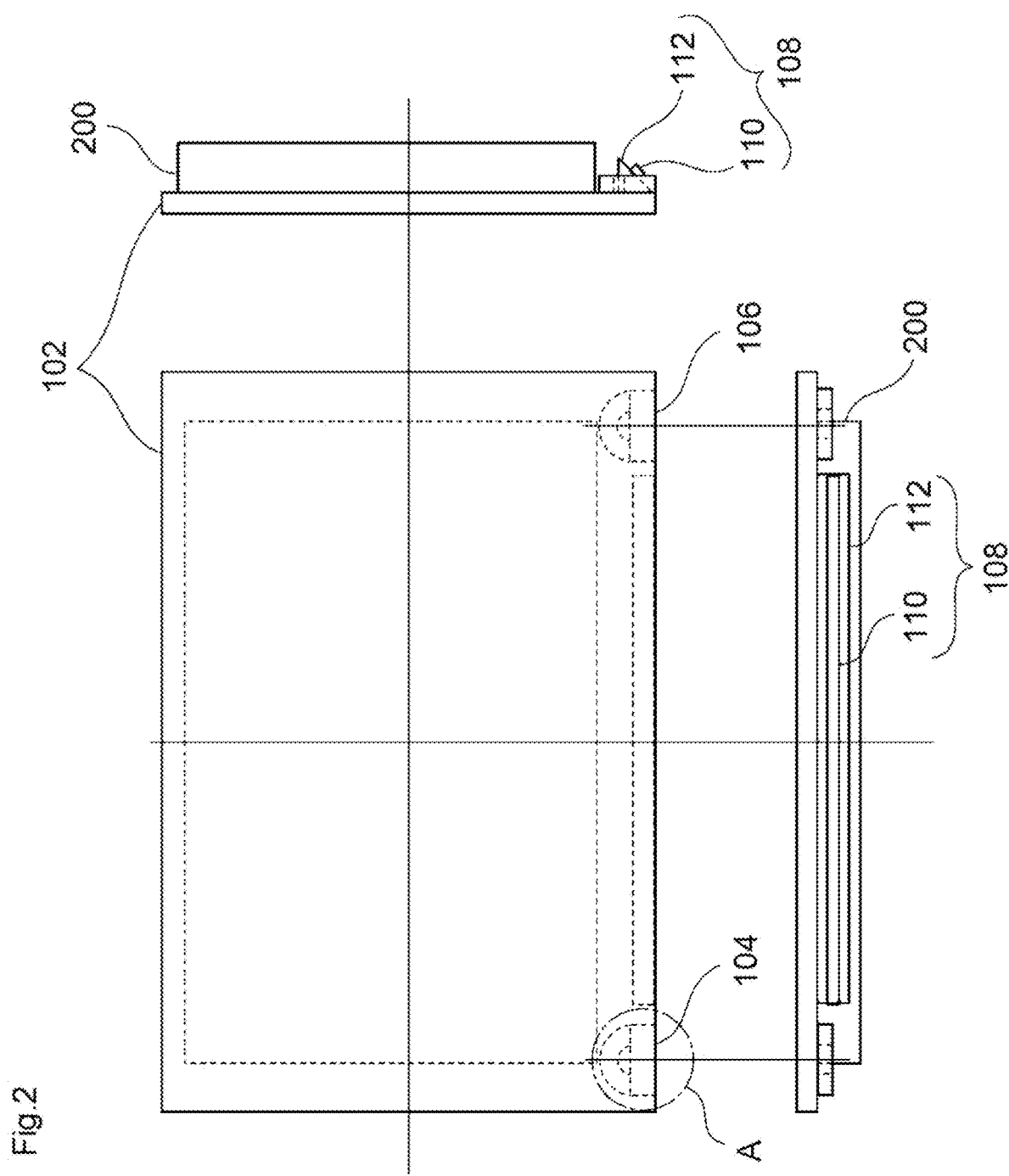
FIG. 2 is a three-plane drawing showing a configuration of the touch panel device of FIG. 1.

As shown in FIG. 2, the light source unit 108 includes an LED array unit 110 and a triangular prism 112. The LED array unit 110 is structured so that a plurality of LED elements are arrayed on a substrate. The triangular prism 112 are joined to the light guide plate 102 and the LED elements are attached to a slope of the triangular prism 112. The slope of the triangular prism 112 forms a predetermined angle to the plane of the light guide plate 102. Preferably, the predetermined angle is larger than an angle that light emitted from the LED elements in the front direction of the LED elements causes total reflection within the light guide plate 102, i.e. critical angle. The critical angle is decided by a refractive index of the light guide plate 102 and that of air. When the light guide plate 102 is made of borosilicate glass (refractive index 1.48), preferably, the predetermined angle is about 50°.

The light source unit 108 receives power supply and control from the light source control unit 116, and radiates the light from the LED elements of the LED array unit 110. The radiated light is infrared radiation having a wavelength of 850 nm. The light radiated from the LED array unit 110 is incident on the light guide plate 102 through the triangular prism 112 and propagates through the light guide plate 102 with repeating the total reflection by the both edges of the light guide plate 102. FIG. 1 schematically shows the light radiated from the light source unit 108 and propagating through the light guide plate 102 by three broken line arrows to the right upside.

As shown in FIG. 1, when a user touches the surface of the light guide plate 102 by his finger 220 or the like, the light radiated from the light source unit 108 and propagating through the light guide plate 102 is scattered at its touch location. A part of the scattered light is propagated to the first sensor unit 104 and the second sensor unit 106 (shown by a broken line arrow downward in FIG. 1).

Each of the first sensor unit 104 and the second sensor unit 106 includes a photo detector device including CCD or CMOS sensor, or the like. The first sensor unit 104 and the second sensor unit 106 are responsive to the control by the sensor control unit 114 for transmitting a detection signal to the primary control unit 118. The primary control unit 118 includes a computing element including CPU or the like, and a memory element. As described later, for example, the photo detector device is a one-dimensional line sensor. The primary control unit 118 computes the touch location on the basis of information of the photo-detected position on the line sensor (the position of the photo-detected pixel).

When the primary control unit 118 drives the light source unit 108 at a predetermining timing by the light source control unit 116 and radiates the light to the inside of the light guide plate 102, the primary control unit 118 waits to receive the detection signals from the first sensor unit 104 and the second sensor unit 106. When the surface of the light guide plate 102 is touched, as described above, the scattered light is caused at the touch location so that the scattered light is detected by the first sensor unit 104 and the second sensor unit 106, and the primary control unit 118 can compute the touch location. The primary control unit 118 outputs, through a predetermined interface, the information of the touch location to a host device 204 including a computer or the like, so that the host device 204 performs appropriate process according to the touch location.

As shown in FIG. 1, when the touch panel device 100 is arranged on a display panel 200 including a liquid crystal display or the like, the touch operation to the touch panel device 100 can be treated as a user's operation to any picture image displayed on the display panel 200 and a user's interface to the host device 204 can be embodied. For example, if the host device 204 is an image forming apparatus, the touch panel device 100 and the display device (the display panel 200 and a display control unit 202) can be used as an operation panel for the image forming apparatus.

Figure 3:
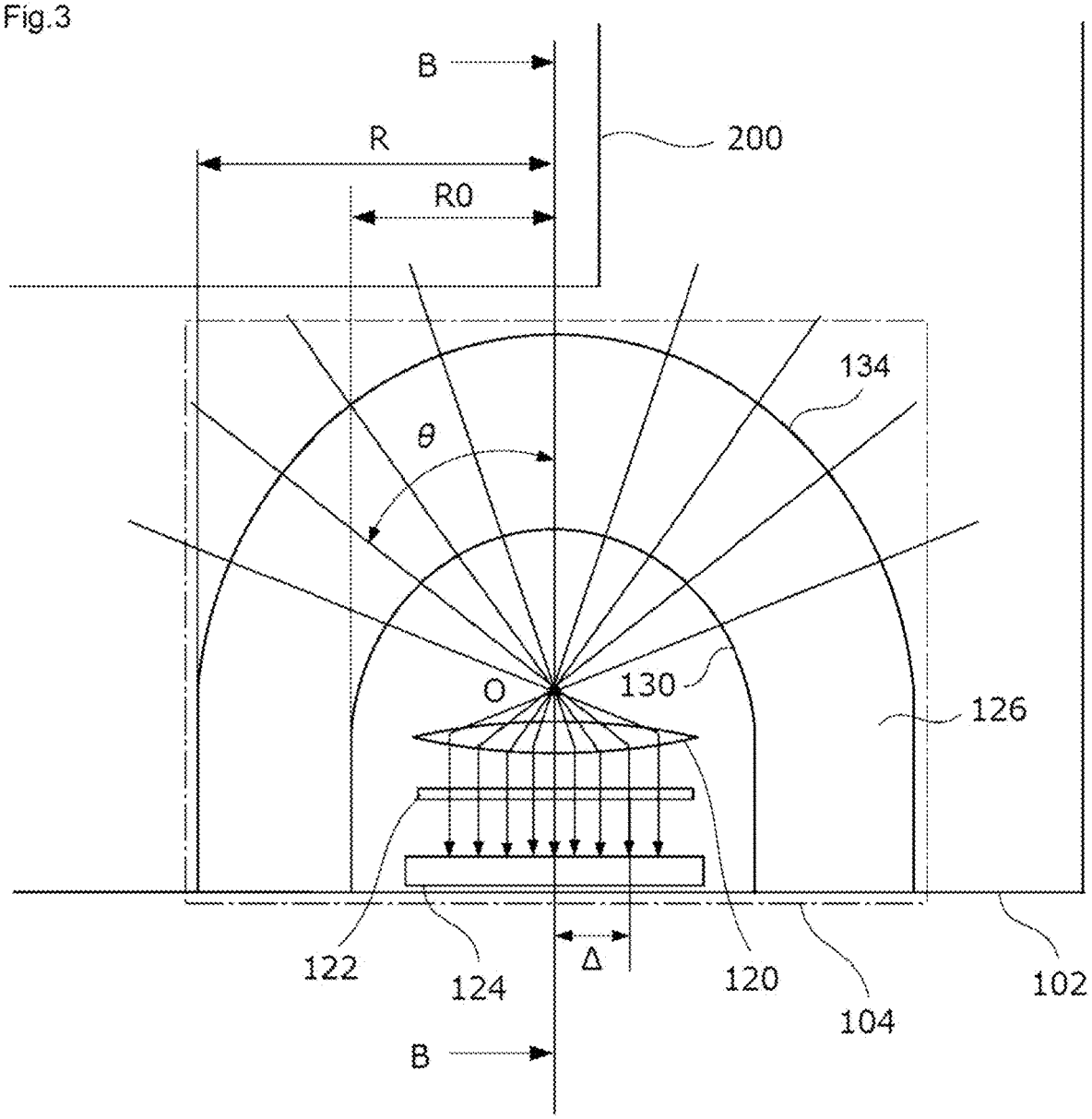
FIG. 3 is a plan view of the touch panel device viewed from the rear surface of a light guide plate with enlarging a region A of FIG. 2.
Figure 4:
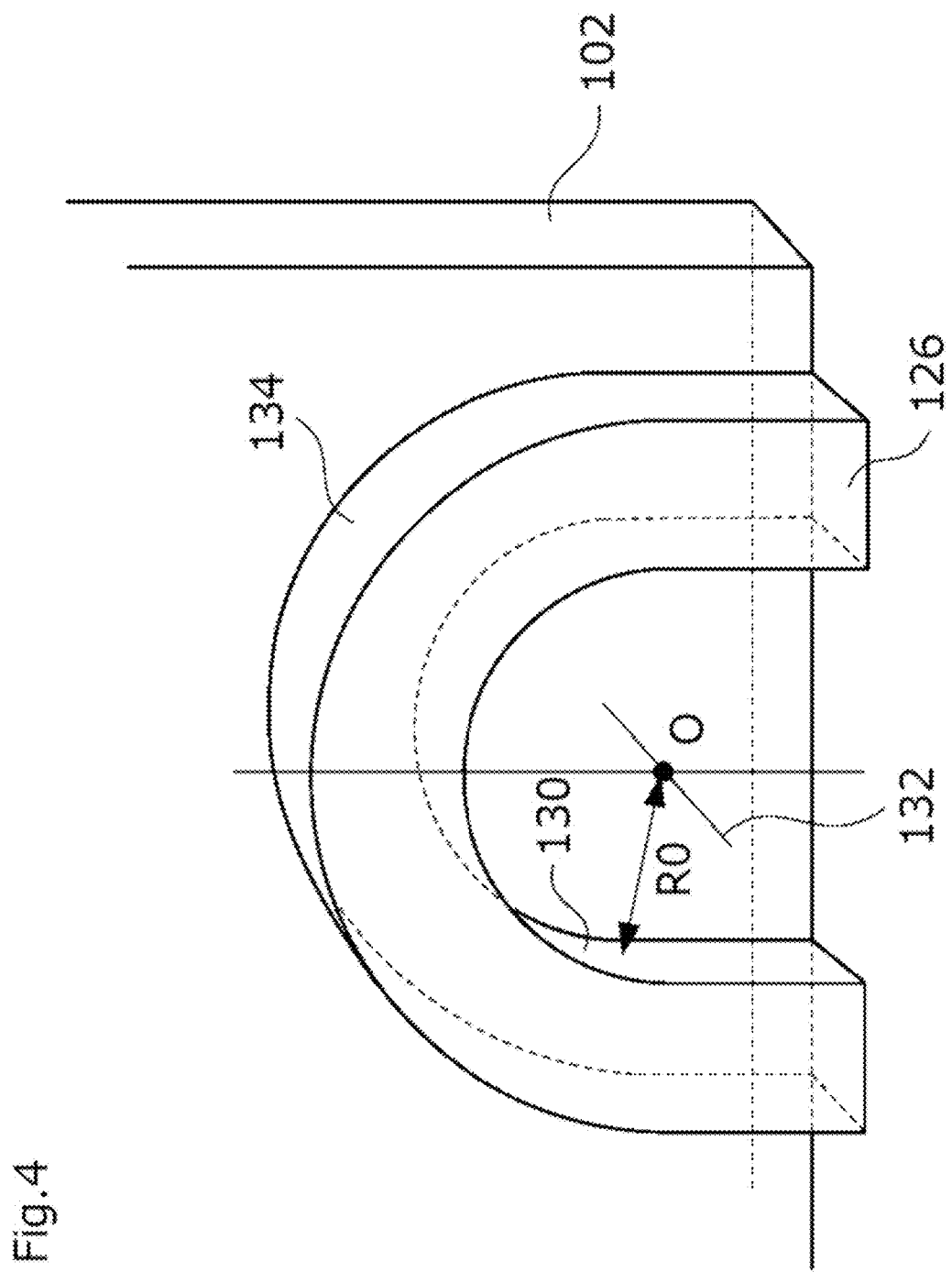
FIG. 4 is a perspective view of the touch panel device viewed from the rear surface of the light guide plate with enlarging a part of the light guide plate of the touch panel device shown in FIG. 1.
Figure 5:
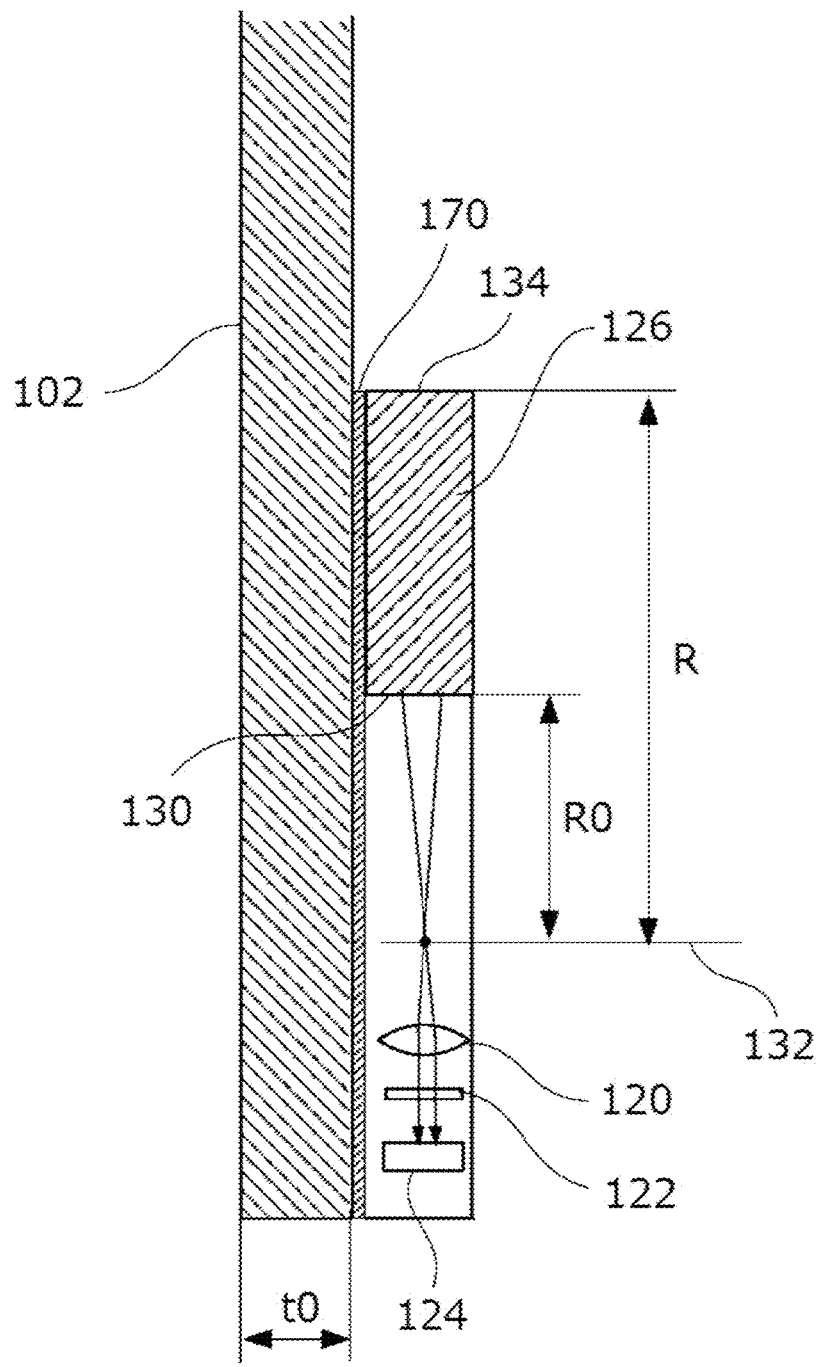
FIG. 5 is a sectional view of the touch panel device taken along a B-B line.

As shown in FIGS. 3-5, according to this embodiment of the present invention, the first sensor unit 104 and the second sensor unit 106 are positioned at the rear surface of the light guide plate 102. With reference to FIG. 3, the first sensor unit 104 includes an optical detecting plate 126, a lens unit 120, a band-pass filter 122 and a sensor 124.

The optical detecting plate 126 is a horseshoe-shaped plate joined to the light guide plate 102 and is provided with two arc-shaped curved surfaces centered at point O. Inner arc-shaped curved surface 130 and outer arc-shaped curved surface 134 are vertical to the surface of the light guide plate 102. Points on the inner arc-shaped curved surface 130 are positioned to be in the same distance (RO) from an axis 132, passing the point O, vertical to the surface of the light guide plate 102. That is, the inner arc-shaped curved surface 130 forms a part of a side of a cylinder of which the central axis is the axis 132 and of which the radius is RO. Similarly, points on the outer arc-shaped curved surface 134 are positioned to be in an equal distance (R) from the axis 132. That is, the outer arc-shaped curved surface 134 forms a part of a side of another cylinder of which the central axis is the axis 132 and of which the radius is R.

With reference to FIG. 5, the optical detecting plate 126 is joined to the light guide plate 102 via an optical joint portion 170. For example, the optical joint portion 170 is an adhesive which is transparent to the light radiated from the light source unit 108. To prevent the change of the refractive index in the optical joint portion 170, preferably, the adhesive is used by e.g. an ultraviolet curing adhesive of acrylic resin (refractive index 1.49). When the adhesive is used, preferably, the optical detecting plate 126 is joined under decompression to prevent air bubbles from generating in the optical joint portion 170.

The sensor 124 is the aforementioned photo detector device, e.g. a line sensor. The band-pass filter 122 has a wavelength enough to optionally pass the light radiated from the light source unit 108. The band-pass filter 122 is provided for preventing another light other than the light radiated from the light source unit 108 (external light incident on the light guide plate 102) from being incident on the sensor 124 and from being detected, erroneously.

The lens unit 120 is provided for focusing the light passing through the inner arc-shaped curved surface 130 and entering the light to the sensor 124. In FIG. 3 etc., the lens unit 120 is drawn as a convex lens and it is because this means an optical lens. The lens unit 120 comprises a combination of a plurality of lenses, i.e. a known f-θ lens.

With respect to the lens unit 120 and the sensor 124, it is preferable that the detection plane of the sensor 124 is vertical to an optical axis of the lens unit 120, the center of the detection plane of the sensor 124 is positioned on the optical axis of the lens unit 120, and the detection plane of the sensor 124 is positioned within the thickness of the optical detecting plate 126. More preferably, the optical axis of the lens unit 120 is positioned to pass the center in thickness direction of the optical detecting plate 126. With this arrangement, by using f-θ lens, an incident angle θ (rad) of the light to the optical axis of the lens is proportional to a distance A from the center of the sensor 124 to the detection point of the light, the sensor being a line sensor in which detecting elements are arranged lineally (see, FIG. 3). Therefore, on the basis of the detection point of the light on the sensor 124, the incident angle θ of the light detected can be computed, easily.

Since a portion of the optical detecting plate 126 facing the lens unit 120 is provided with an arc-shaped curved surface, the light entering from the normal direction of the inner arc-shaped curved surface 130 to the inner arc-shaped curved surface 130 is focused to the axis 132. However, another light entering from a direction other than the normal direction of the inner arc-shaped curved surface 130 to the inner arc-shaped curved surface 130 is reflected by the inner arc-shaped curved surface 130 or is not focused to the axis 132 even passing through the inner arc-shaped curved surface 130, so that it is impossible for another light to be incident on the lens unit 120. That is, among the scattered light caused by the touch operation, the light positioned in the linear direction connecting the touch location to the first sensor unit 104 and the second sensor unit 106 is optionally focused and entered to the lens unit 120. Therefore, the contour of the light detected can be clarified more than the conventional case, so that the precision of detecting the touch location by the sensor 124 can be improved.

Figure 6:
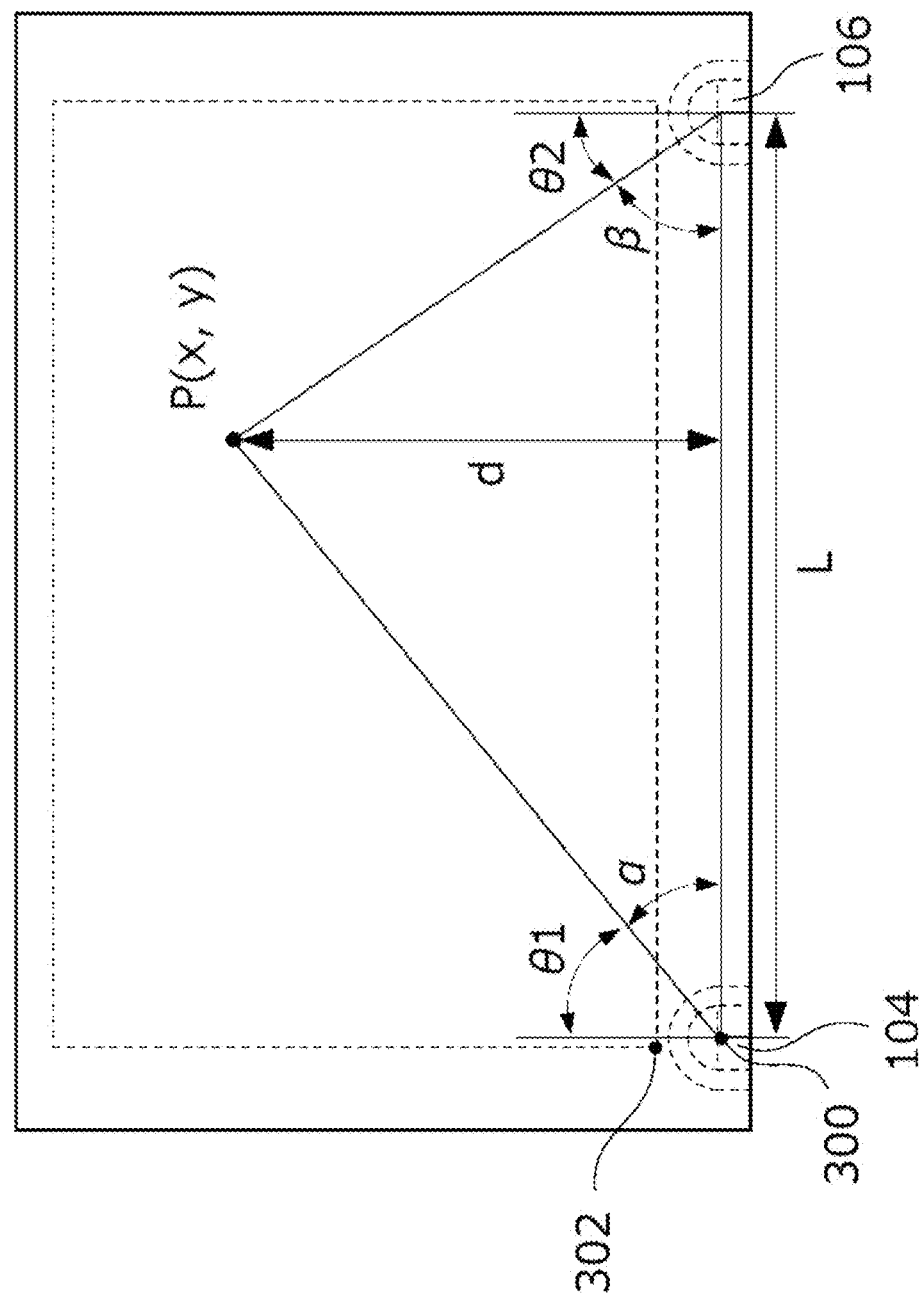
FIG. 6 is a plan view of the touch panel device showing a computing method of a touch location.

The second sensor unit 106 is structured as the first sensor unit 104 and has the same function as it. With reference to FIG. 6, on the basis of the points detected by the first sensor unit 104 and the second sensor unit 106, the incident angle θ1 (rad) and the incident angle θ2 (rad) of the corresponding light can be computed. From the incident angle θ1 and the incident angle θ2, angles α (rad) and β (rad) formed between the light and a line connecting the first sensor unit 104 and the second sensor unit 106 can be calculated. That is, the angles α and β are calculated by $\alpha=\pi/2-\theta 1$, $\beta=\pi/2-\theta 2$. When it is defined that the touch location is P, a distance from the line connecting the first sensor unit 104 and the second sensor unit 106 to the touch location is d, and a distance between the first sensor unit 104 and the second sensor unit 106 is L, a formula $L=d/\tan\alpha+d/\tan\beta$. Using this formula, the angles α and β, and the distance L between the first sensor unit 104 and the second sensor unit 106 are substituted for the formula to calculate the distance d and then the position coordinate (x, y) of the touch location P can be decided. That is, when the distance d is calculated, y is decided by y=d, x is decided by $x=d/\tan\alpha$. The value of the distance L is preliminarily stored in the internal memory of the primary control unit 118.

The calculated position coordinate (x, y) is a position coordinate in a coordinate system of the first sensor unit 104 and the second sensor unit 106, e.g. a coordinate system at the origin of point 300. If the touch point P is represented, e.g. as a position coordinate in the display panel 200, coordinate transformation that the origin is shifted in parallel from the point 300 to another point 302 is performed to the calculated position coordinate (x, y). The parameters necessary for the coordinate transformation are preliminarily stored in the internal memory of the primary control unit 118.

As described above, the portion of the light guide plate 102 facing the lens unit 120 is provided with the inner arc-shaped curved surface 130, so that the detection precision of the touch location detected by the sensor 124 of each of the first sensor unit 104 and the second sensor unit 106 is very high and the precision of calculating the angles α and (is very high, also. Therefore, the precision of detecting the touch location P is very high.

Second Embodiment

While the optical detecting plate 126 facing each of the first sensor unit 104 and the second sensor unit 106 is provided with the arc-shaped curved surface along the normal line of the surface of the light guide plate 102 in the first embodiment of the present invention, in a second embodiment of the present invention, a slope crossing the normal line of the surface of the light guide plate 102 is provided. The touch panel device according to this embodiment is structured as the touch panel device 100 according to the first embodiment and has the same function as it.

Figure 7:
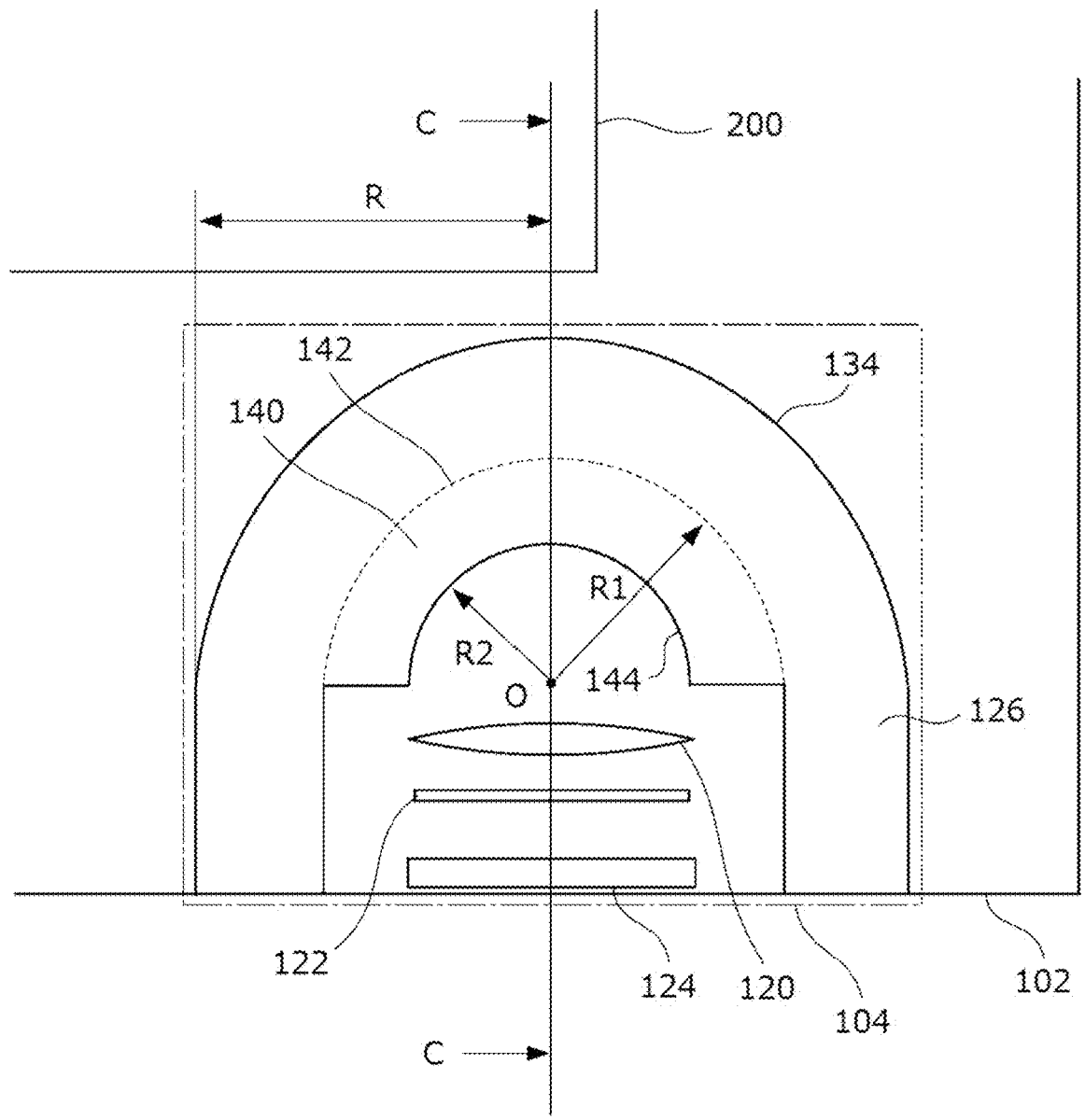
FIG. 7 is a plan view of a touch panel device viewed from the rear surface of a light guide plate with enlarging a part of the touch panel device according to a second embodiment of the present invention.
Figure 8:
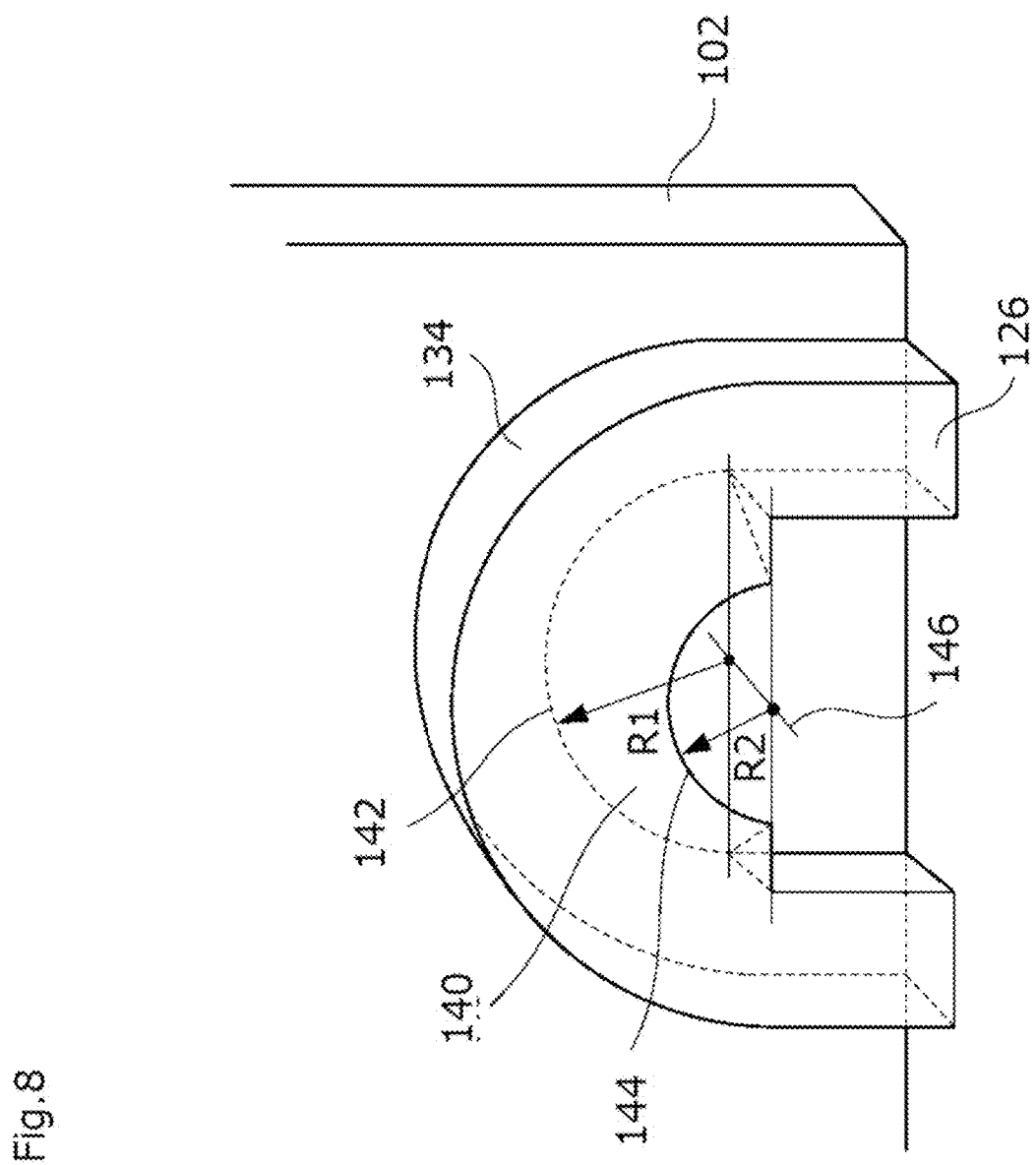
FIG. 8 is a sectional view of the touch panel device viewed from the rear surface of the light guide plate with enlarging a part of the touch panel device according to the second embodiment of the present invention.
Figure 9:
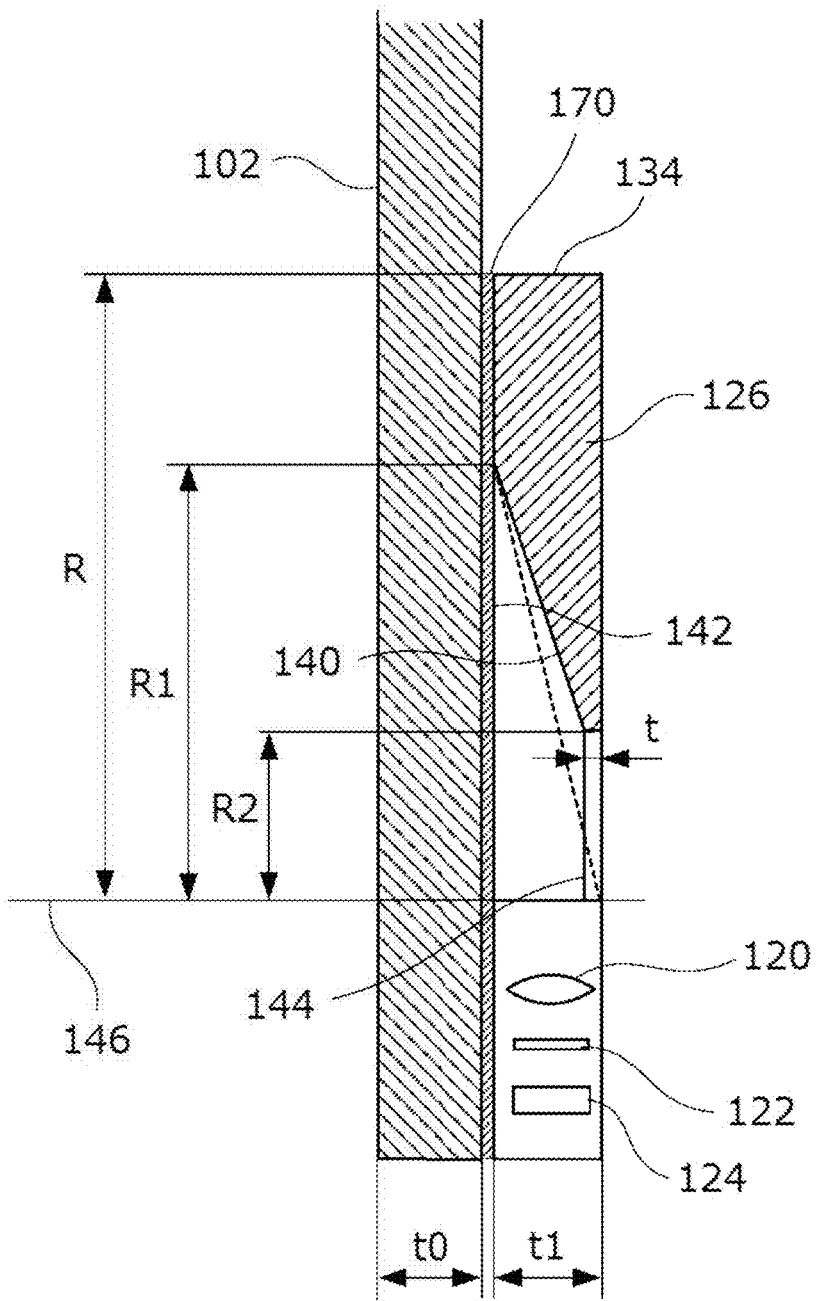
FIG. 9 is a sectional view of the touch panel device taken along a C-C line of FIG. 7.

In the touch panel device according to this embodiment, the optical detecting plate 126 facing each of the first sensor unit 104 and the second sensor unit 106 is structured as shown in FIGS. 7-9. As the first embodiment, the first sensor unit 104 includes an optical detecting plate 126, a lens unit 120, a band-pass filter 122 and a sensor 124.

The optical detecting plate 126 is a horseshoe-shaped plate joined to the light guide plate 102. The outer arc-shaped curved surface 134 is vertical to the surface of the light guide plate 102. The points on the outer arc-shaped curved surface 134 are positioned to be in an equal distance (R) from an axis 146 vertical to the surface of the light guide plate 102. That is, the outer arc-shaped curved surface 134 forms a part of a side of another cylinder of which the central axis is the axis 132 and of which the radius is R.

A portion of the optical detecting plate 126 facing each of the first sensor unit 104 and the second sensor unit 106 is provided with a slope 140 so as to form a part of a conical surface (surface of a cone). That is, the slope 140 forms a part of the conical surface of which the central axis is the axis 146 vertical to the surface of the light guide plate 102. The slope 140 is decided by a radius R1 of an outer arc-shaped curve 142, a radius R2 of an inner arc-shaped curve 144, and a thickness t of a portion of an inner arc-shaped curve (a distance between the inner arc-shaped curve 144 and the rear surface of the optical detecting plate 126). The portion of the thickness t is an arc-shaped curved surface forming a part of the side of a cylinder of which the central axis is the axis 146 and of which the radius is R2. In addition, as shown by the broken line in the sectional view of FIG. 9, the radius R2 and the thickness t of the inner arc-shaped curve 144 may be 0 (zero).

The optical detecting plate 126 is transparent to the light radiated from the light source unit and is made of a material of which the refractive index is approximately the same as that of the light guide plate 102 (borosilicate glass: refractive index 1.48), i.e. acrylic resin (refractive index 1.49).

With reference to FIG. 9, the optical detecting plate 126 is joined to the light guide plate 102 via an optical joint portion 170. For example, the optical joint portion 170 is an adhesive which is transparent to the light radiated from the light source unit. To prevent the change of the refractive index in the optical joint portion 170, preferably, the adhesive is used by e.g. an ultraviolet curing adhesive of acrylic resin (refractive index 1.49). When the adhesive is used, preferably, the optical detecting plate 126 is joined under decompression to prevent air bubbles from generating in the optical joint portion 170.

Figure 10:
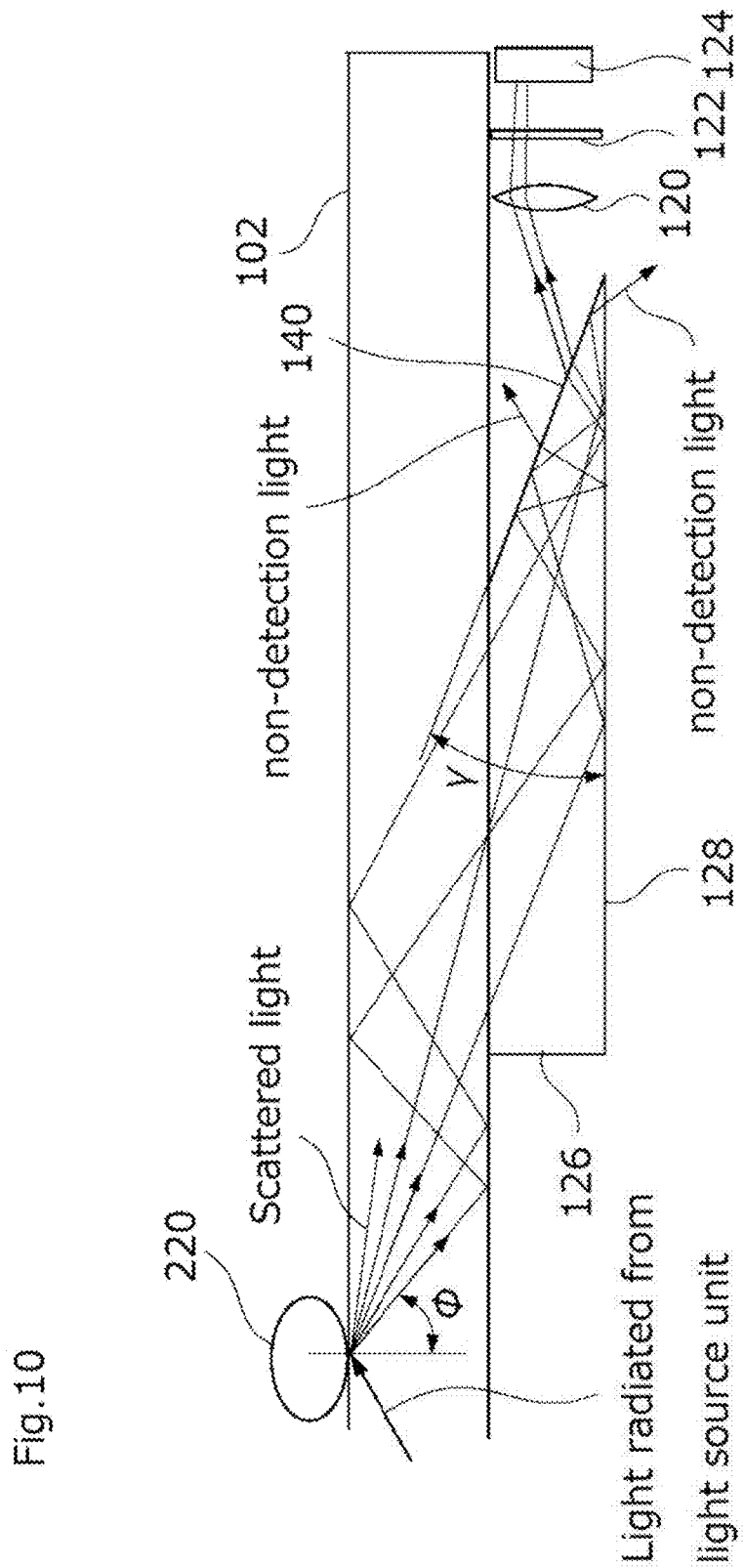
FIG. 10 is a diagram showing paths of the scattered light propagating through the inside of the light guide plate.

FIG. 10 is a diagram showing paths (optical paths, hereinafter) of the scattered light propagating through the inside of the light guide plate 102 and the optical detecting plate 126 of the touch panel device according to this embodiment of the present invention. The optical detecting plate 126 of FIG. 10 corresponds to the shape (R2=0, t=0) shown by the broken line in FIG. 9.

As shown in FIG. 10, the scattered light caused when a user touches the surface of the light guide plate 102 by his finger 220 or the like is propagated to the inside of the light guide plate 102 and the optical detecting plate 126, and then emitted from the slope 140 outside the optical detecting plate 126, and entered into the lens unit 120. At this time, there is light which is not incident on the lens unit 120 among the light radiated from the slope 140. In FIG. 10, such light which is not incident on the lens unit 120 is denoted by "nondetection light". Further, a part of the scattered light is emitted from a surface other than the slope 140, e.g. the rear surface 128 of the optical detecting plate 126. This light is not incident on the lens unit 120 and is the nondetection light.

In what direction the scattered light propagating through the inside of the light guide plate 102 is emitted from the slope 140, and a proportion that the scattered light is emitted from a surface other than the slope 140 depend on a thickness t0 of the light guide plate 102 and a thickness t1 of the optical detecting plate 126; materials (refractive index) of the light guide plate 102 and the optical detecting plate 126; and an angle of inclination γ of the slope 140 (an angle in a plane including the axis 146). To make the strength of the light incident on the lens unit 120 to be appropriate largeness, it is necessary to set the angle of inclination γ appropriate dependent on the materials and thicknesses of the light guide plate 102 and the optical detecting plate 126.

The optical paths are simulated by changing an angle of scatter φ under the condition that the refractive index of the materials of the light guide plate 102 and the optical detecting plate 126 is 1.49, and the thickness t0=t1. Each of the thickness t0 of the light guide plate 102 and the thickness t1 of the optical detecting plate 126 is 2 mm, for example. As a result, preferably, the angle of inclination γ of the slope 140 is in the range of about 10-40°. More preferably, the angle of inclination γ is in the range of about 15-25°. When the angle of inclination γ is less than 10°, the scattered light of which the angle of scatter φ is larger is of total reflection by the slope 140 even if it reaches the slope 140, and emitted from the rear surface of the optical detecting plate 126, so that it cannot reach the lens unit 120. On the other hand, when the angle of inclination γ is larger than 40°, a major part of the scattered light is emitted from the slope 140, but much light is emitted to the upside of the light guide plate 102 (the front side of the touch panel device) and sufficient light cannot reach the lens unit 120.

The same effect as the first embodiment can be offered by the light guide plate 102 and the optical detecting plate 126 providing with the slope 140 of an appropriate angle of inclination γ. That is, the lens unit 120 focuses the light passing through the slope 140 and enters it to the sensor 124. The lens unit 120 comprises e.g. a known f-θ lens. On the basis of the detection point of the light on the sensor 124, the incident angle θ of the light detected can be computed, easily.

Since a portion of the optical detecting plate 126 (the slope 140) facing the lens unit 120 is provided with a conical surface, the light propagating through the plane including the axis 146 among the light entering to the slope 140 is focused to the axis 146. However, another light entering to the slope 140 from other than the plane including the axis 146 is reflected by the slope 140 or is not focused to the axis 146 even passing through the slope 140, so that it is impossible for another light to be incident on the lens unit 120. That is, among the scattered light caused by the touch operation, the light positioned in the linear direction connecting the touch location to the first sensor unit 104 and the second sensor unit 106 is optionally focused and entered to the lens unit 120. Therefore, the contour of the light detected can be clarified more than the conventional case, so that the precision of detecting the touch location by the sensor 124 can be improved.

When the radius R2 and the thickness t of the inner arc-shaped curve 144 are not 0 (zero), and the thickness t1 of the optical detecting plate 126 is about 2 mm, preferably, t=0.2-0.5 (mm).

The second sensor unit 106 is structured as the first sensor unit 104 and has the same function as it. Therefore, as the first embodiment, on the basis of the points detected by the first sensor unit 104 and the second sensor unit 106, regarding to the corresponding light, the angles α and β can be obtained and the position coordinate (x, y) of the touch location P can be decided. At this time, since the slope is provided at the edges of the light guide plate 102 facing the lens unit 120, the detection precision of the touch location detected by the sensor 124 of each of the first sensor unit 104 and the second sensor unit 106 is very high and the precision of calculating the angles α and β is very high, also. Therefore, the precision of detecting the touch location P is very high.

Third Embodiment

In the third embodiment, a reflection plate is provided to increase the scattered light incident on the first sensor unit 104 and the second sensor unit 106 more than in the second embodiment, and to prevent the external light incident on the light guide plate from being incident on the first sensor unit 104 and the second sensor unit 106.

Figure 11:
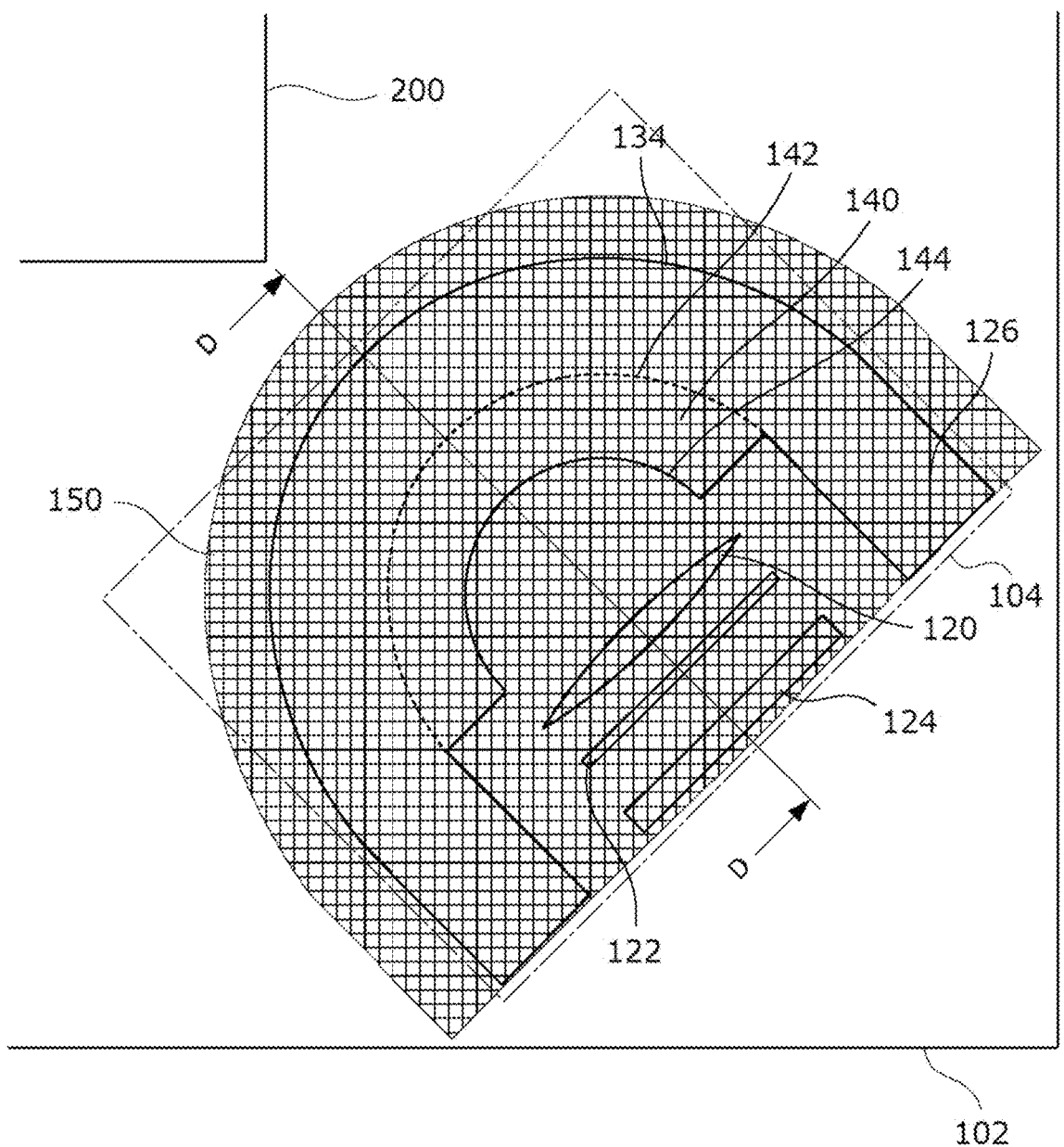
FIG. 11 is a plan view of a touch panel device viewed from the rear surface of a light guide plate with enlarging a part of the touch panel device according to a third embodiment of the present invention.

The touch panel device according to this embodiment is structured as the touch panel device 100 according to the first embodiment and has the same function as it. The reference numerals of FIGS. 1 and 2 are referred to hereinafter. The shape of the portion of the optical detecting plate 126 facing each of the first sensor unit 104 and the second sensor unit 106 is the same as the second embodiment. However, as shown in FIG. 11, the touch panel device according to this embodiment is different from in the second embodiment in that the first sensor unit 104 and the second sensor unit 106 are arranged to be rotated at a predetermined angle, and the surface of the light guide plate 102 is provided with a reflection plate.

Specifically, as being viewed from the rear surface of the light guide plate 102, the first sensor unit 104 is arranged to be rotated at 45° counterclockwise. Similarly, the second sensor unit 106 is arranged to be rotated at 45° clockwise. In this case, in the first sensor unit 104, preferably, the lens unit 120 and the sensor 124 are arranged so that the optical axis of the lens unit 120 passes the center of the detecting portion of the sensor 124.

Figure 12:
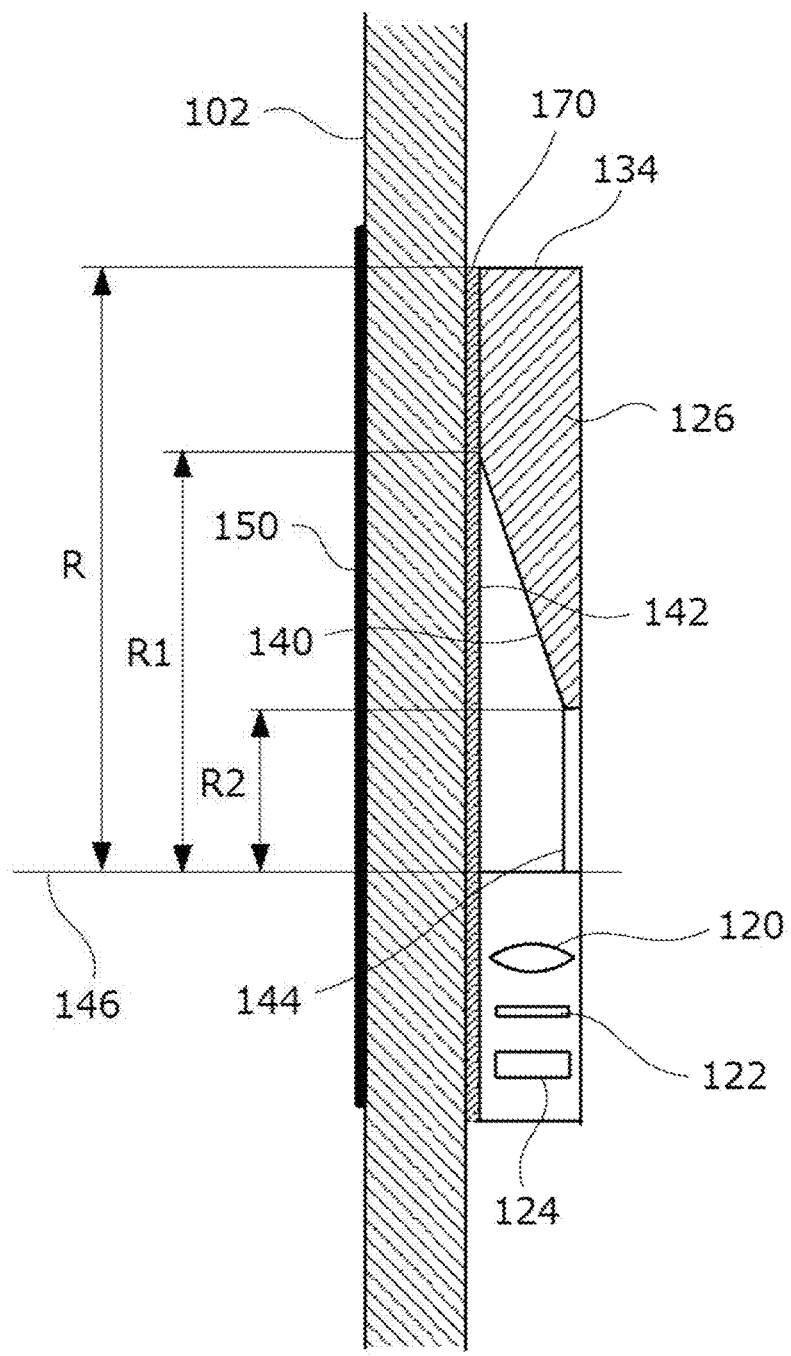
FIG. 12 is a sectional view of the touch panel device taken along a D-D line of FIG. 11.

Hereinafter, the structure of the first sensor unit 104 is mainly explained, but the second sensor unit 106 is the same as the first sensor unit 104. The optical detecting plate 126 facing the first sensor unit 104 is structured as shown in FIGS. 11 and 12. As the first embodiment, the first sensor unit 104 includes the lens unit 120, the band-pass filter 122 and the sensor 124.

The optical detecting plate 126 is a horseshoe-shaped plate joined to the light guide plate 102. The outer arc-shaped curved surface 134 is vertical to the surface of the light guide plate 102. The points on the outer arc-shaped curved surface 134 are positioned to be in an equal distance (R) from the axis 146 which passes the point O and is vertical to the surface of the light guide plate 102. That is, the outer arc-shaped curved surface 134 forms a part of a side of a cylinder of which the central axis is the axis 146 and of which the radius is R.

A portion of the optical detecting plate 126 facing the first sensor unit 104 is provided with a slope 140 so as to form a part of a conical surface (surface of a cone). That is, the slope 140 forms a part of the conical surface of which the central axis is the axis 146 vertical to the surface of the light guide plate 102. The slope 140 is decided by a radius R1 of an outer arc-shaped curve 142, a radius R2 of an inner arc-shaped curve 144, and a thickness t of a portion of an inner arc-shaped curve (a distance between the inner arc-shaped curve 144 and the rear surface of the optical detecting plate 126). The portion of the thickness t is an arc-shaped curved surface forming a part of the side of a cylinder of which the central axis is the axis 146 and of which the radius is R2.

With reference to FIG. 12, the optical detecting plate 126 is joined to the light guide plate 102 via an optical joint portion 170. For example, the optical joint portion 170 is an adhesive which is transparent to the light radiated from the light source unit. To prevent the change of the refractive index in the optical joint portion 170, preferably, the adhesive is used by e.g. an ultraviolet curing adhesive of acrylic resin (refractive index 1.49). When the adhesive is used, preferably, the optical detecting plate 126 is joined under decompression to prevent air bubbles from generating in the optical joint portion 170.

The reflection plate 150 is semicircular and is positioned, on the surface of the light guide plate 102, corresponding to the position of the optical detecting plate 126. The reflection plate 150 is made by coating a mirror-making paint, e.g. "mirror spray", product no. MS-80 produced by Acrysunday Co. at a predetermined thickness. The mirror-making paint contains fine metal particles (e.g. aluminum particles) and makes a mirror for reflecting the light when it is cured.

The reflection plate 150 may be made by a known method including evaporation or sputtering of aluminum, or the like.

As discussed in the second embodiment, to make the strength of the light incident on the lens unit 120 to be appropriate largeness, it is necessary to set the angle of inclination γ appropriate dependent on the materials and thicknesses of the light guide plate 102 and the optical detecting plate 126. Even if the angle of inclination γ of the slope 140 is set in a preferable range (about 10-40°, more preferably, about 15-25°), a part of the scattered light is emitted from the surface of the light guide plate 102 and is not incident on the lens unit 120 as the nondetection light.

Thus, without the reflection plate 150, some light which is emitted from the surface of the light guide plate 102 is the nondetection light. However, according to this embodiment, with the reflection plate 150, such light can be reflected by the reflection plate 150 and then be propagated through the light guide plate 102. Therefore, the loss of the scattered light due to the emission from the surface of the light guide plate 102 can be reduced, and the light incident on the lens unit 120 can be increased.

Further, the reflection plate 150 prevents light entering to the light guide plate 102 from the outside of the light guide plate 102, especially, the front side of the light guide plate 102 from entering to the optical detecting plate 126 and then entering to the first sensor unit 104 and the second sensor unit 106. Therefore, by arranging the reflection plate 150 with appropriate largeness at an appropriate position of the light guide plate 102, the detection precision by the first sensor unit 104 and the second sensor unit 106 can be improved.

(Variation 1)

Figure 13:
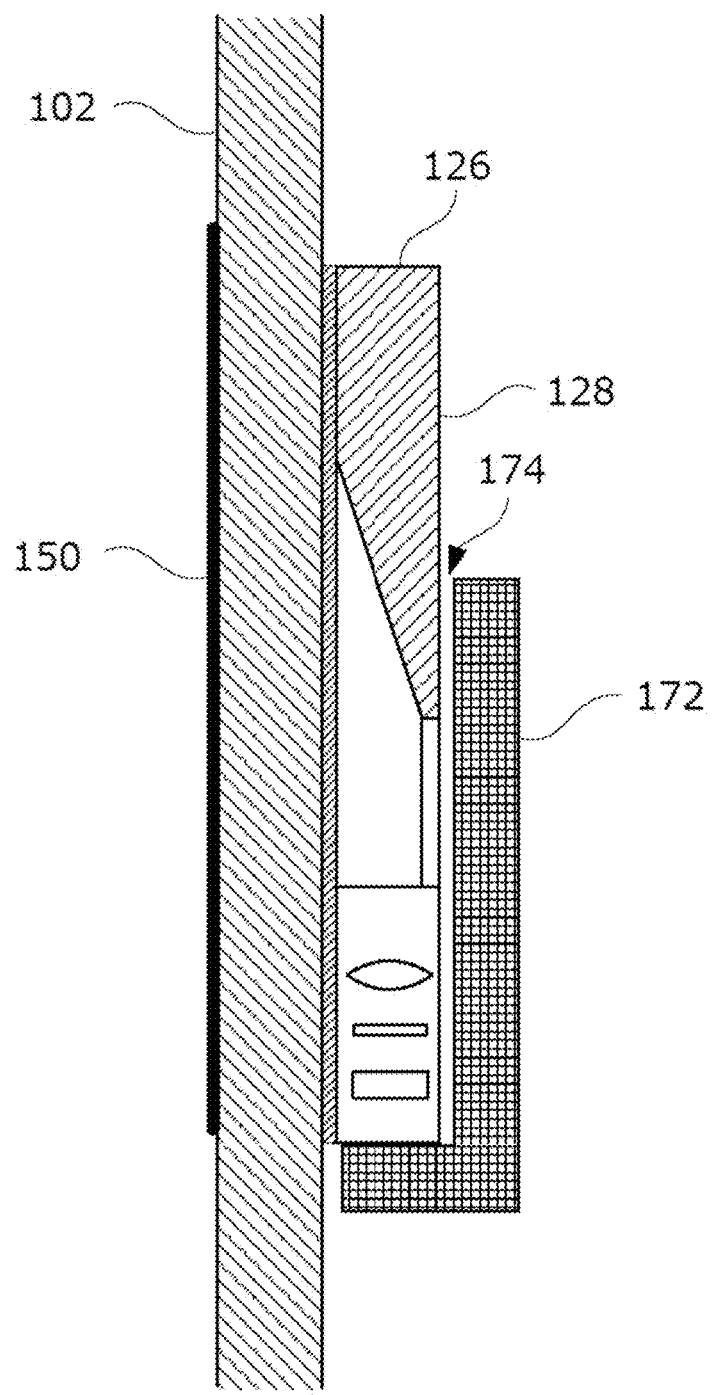
FIG. 13 is a sectional view of the touch panel device showing that a cover is positioned at the rear surface of a detecting optical plate.

To prevent the surrounding light, especially, at the rear surface of the touch panel device 100 from entering to the sensor, the touch panel device 100 may be provided with a cover for covering the sensor unit. For example, as shown in FIG. 13, a black cover 172 is provided adjacent to the rear surface of the optical detecting plate 126 of the sensor unit. At this time, preferably, the black cover 172 is not close to the rear surface 128 of the optical detecting plate 126, but has a predetermined gap 174 therebetween. If the black cover 172 is close to the rear surface 128 of the optical detecting plate 126, the scattered light propagating through the optical detecting plate 126 and reaching a closed portion with the black cover 172, at least, a part thereof, may be absorbed by the black cover 172, even if the angle of inclination is suitable for the total reflection. Then, the strength of the scattered light incident on the sensor unit may be reduced. When the black cover 172 is positioned to be separated from the optical detecting plate 126, it is possible to prevent the absorption by the black cover 172 and the reduction of the strength of the scattered light incident on the sensor unit.

(Variation 2)

Figure 14:
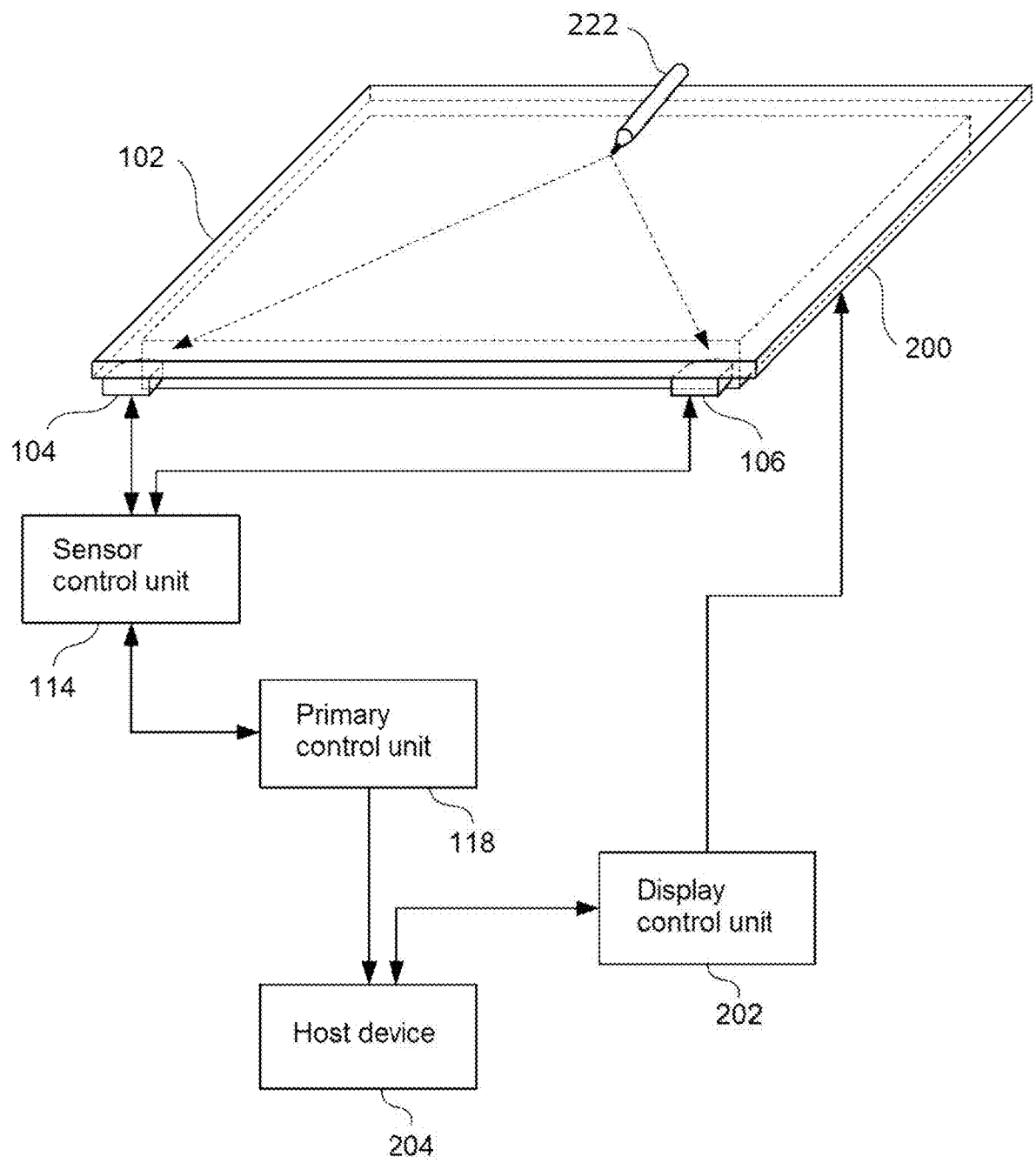
FIG. 14 is a schematic configuration diagram of the touch panel device using an LED pen.

In the above description, it is explained that the touch panel device is provided with a light source unit, but the present invention should not be limited to this. When an LED pen for emitting light is used, it is not necessary to provide the light source unit. For example, the touch panel device shown in FIG. 14 is not provided with the light source unit 108 and the light source control unit 116 shown in FIG. 1. In this case, when a tip portion of an LED pen 222 is touched on the surface of the light guide plate 102, the light emitted from an LED element positioned at the tip portion is incident on the light guide plate 102. As the scattered light described above, the light entered to the light guide plate 102 is detected by the first sensor unit 104 and the second sensor unit 106, and the touch location by the LED pen 222 is calculated.

(Variation 3)

Figure 15:
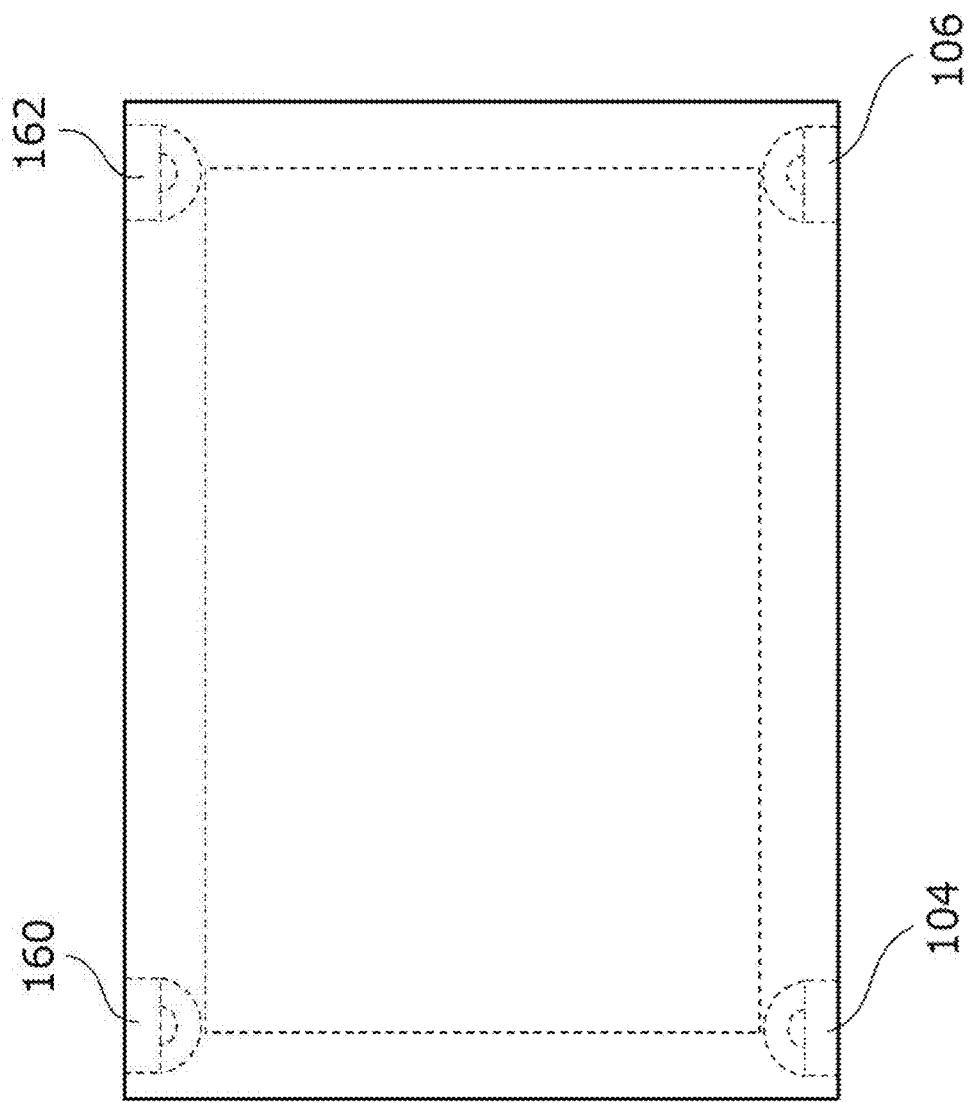
FIG. 15 is a plan view of a touch panel device which can detect touch locations by a plurality of LED pens, simultaneously.

In the above description, it is explained that the touch panel device is provided with two sensor units, but the present invention should not be limited to this. For example, as shown in FIG. 15, the touch panel device may be provided with four sensor units. A third sensor unit 160 and a fourth sensor unit 162 are structured as the first sensor unit 104 and the second sensor unit 106. For example, when two kinds of LED pens are used and the wavelengths emitted from the LED elements are different from each other, the wavelength range of the band-pass filter for the first sensor unit 104 and the second sensor unit 106 is set to be different from the wavelength range of the band-pass filter for the third sensor unit 160 and the fourth sensor unit 162. Accordingly, when the two kinds of LED pens are used simultaneously, the touch location of each of the LED pens can be detected.

Specifically, the band-pass filter for the first sensor unit 104 and the second sensor unit 106 is set to pass the light emitted from the LED element of a first LED pen, but is set not to pass the light emitted from the LED element of a second LED pen. The band-pass filter for the third sensor unit 160 and the fourth sensor unit 162 is set to pass the light emitted from the LED element of the second LED pen, but is set not to pass the light emitted from the LED element of the first LED pen. Then, the touch location by the first LED pen can be detected by the first sensor unit 104 and the second sensor unit 106, and the touch location by the second LED pen can be detected by the third sensor unit 160 and the fourth sensor unit 162.

In the above first-third embodiments, the arc-shaped curved surface 130 and the slope 140 of the optical detecting plate 126 can be made by cutting a rectangular plane. The optical detecting plate 126 may be made by injection molding.

In the above description, the light guide plate 102 is made of glass, but it should not be limited to this. The light guide plate 102 may be made of a material capable to propagate the light emitted from the light source unit or the LED pen in a low attenuation factor, and the material may be acrylic resin or the like.

In the above description, the lens unit 120 and the sensor 124 are arranged so that the optical axis of the lens unit 120 can pass the center of the detecting portion of the sensor 124, but it should not be limited to this. When the first sensor unit 104 and the second sensor unit 106 are arranged as shown in FIGS. 1 and 2, as being apparent from FIGS. 3 and 6, the sensor 124 of the first sensor unit 104 detects the light with a left-sided half region viewed from the touch surface of the light guide plate 102, and the sensor 124 of the second sensor unit 106 detects the light with a right-sided half region viewed from the touch surface of the light guide plate 102. Therefore, it may be possible to arrange the sensor 124 of the first sensor unit 104 so that the optical axis of the lens unit 120 can pass the right side of the detecting portion of the sensor 124 viewed from the touch surface of the light guide plate 102. Further, it may be possible to arrange the sensor 124 of the second sensor unit 106 so that the optical axis of the lens unit 120 can pass the left side of the detecting portion of the sensor 124 viewed from the touch surface of the light guide plate 102. Then, the detecting portion of the sensor can be effectively used to improve the detection precision (resolution).

In the first and second embodiments, as shown in FIG. 11, the first sensor unit 104 may be arranged to be rotated at a predetermined angle (e.g. 45°) counterclockwise viewed from the touch surface of the light guide plate 102. Similarly, the second sensor unit 106 may be arranged to be rotated at a predetermined angle (e.g. 45°) clockwise viewed from the touch surface of the light guide plate 102. When the first sensor unit 104 is arranged to be rotated at about 45°, preferably, the lens unit 120 and the sensor 124 are arranged so that the optical axis of the lens unit 120 passes the center of the detecting portion of the sensor 124. This is the same when the second sensor unit 106 is arranged to be rotated at about 45°. In order to effectively utilize the detecting portion of the sensor of the first sensor unit 104 and the second sensor unit 106, preferably, the position between the optical axis of the lens unit 120 and the detecting portion of the sensor 124 is decided by the range of the touch location on the light guide plate 102 to be detected by the first sensor unit 104 and the second sensor unit 106, and the positions of the first sensor unit 104 and the second sensor unit 106.

In addition, the central angle of each of the arc-shaped curved surface 130 and the slope 140 should not be limited to 180° shown in FIGS. 3, 7 and 11. With respect to the position of the optical detecting plate 126 and the sensor unit to the light guide plate 102, when they are positioned at the corner of the light guide plate 102 or its adjacency, the central angle of each of the arc-shaped curved surface 130 and the slope 140 may be more than 90°.

The position of the optical detecting plate 126 and the sensor unit to the light guide plate 102 should not be limited to the corner of the light guide plate 102 or its adjacency. The optical detecting plate 126 and the sensor unit may be positioned at the central portion of a long side or a short side of the light guide plate 102. In this case, preferably, the central angle of the arc of the arc-shaped curved surface 130 or the arc-shaped curve 142 is about 180°.

In the above description, it is explained that the reflection plate 150 shown in FIG. 11 is formed on the light guide plate of the touch panel device according to the second embodiment, but it should not be limited to this. The reflection plate may be positioned on the light guide plate of the touch panel device according to the first embodiment.

Fourth Embodiment

Figure 16:
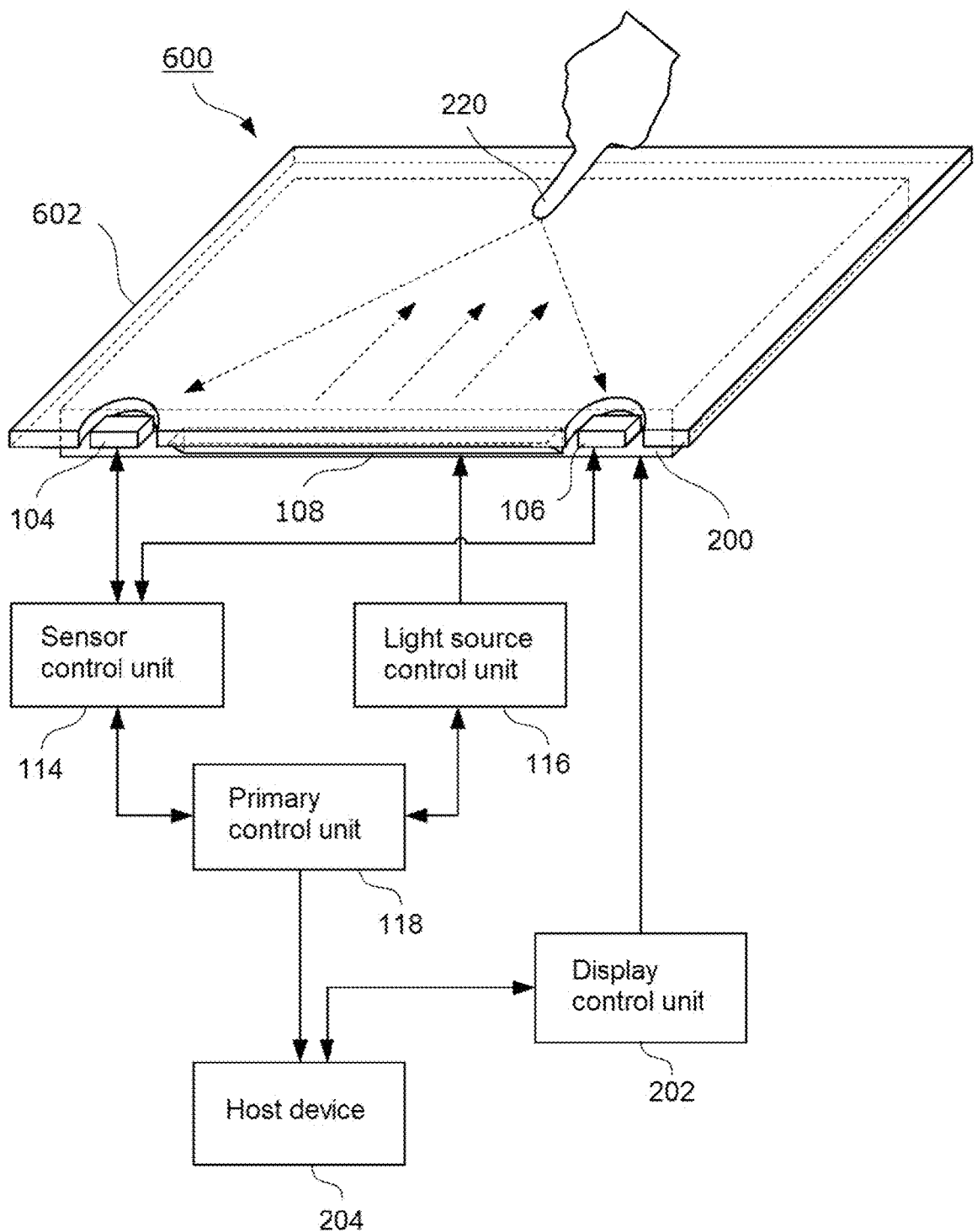
FIG. 16 is a schematic configuration diagram of a touch panel device according to a fourth embodiment of the present invention.

With reference to FIG. 16, a touch panel device 600 according to a forth embodiment of the present invention comprises a light guide plate 602, the first sensor unit 104, the second sensor unit 106, the light source unit 108, the sensor control unit 114, the light source control unit 116, and the primary control unit 118.

Figure 17:
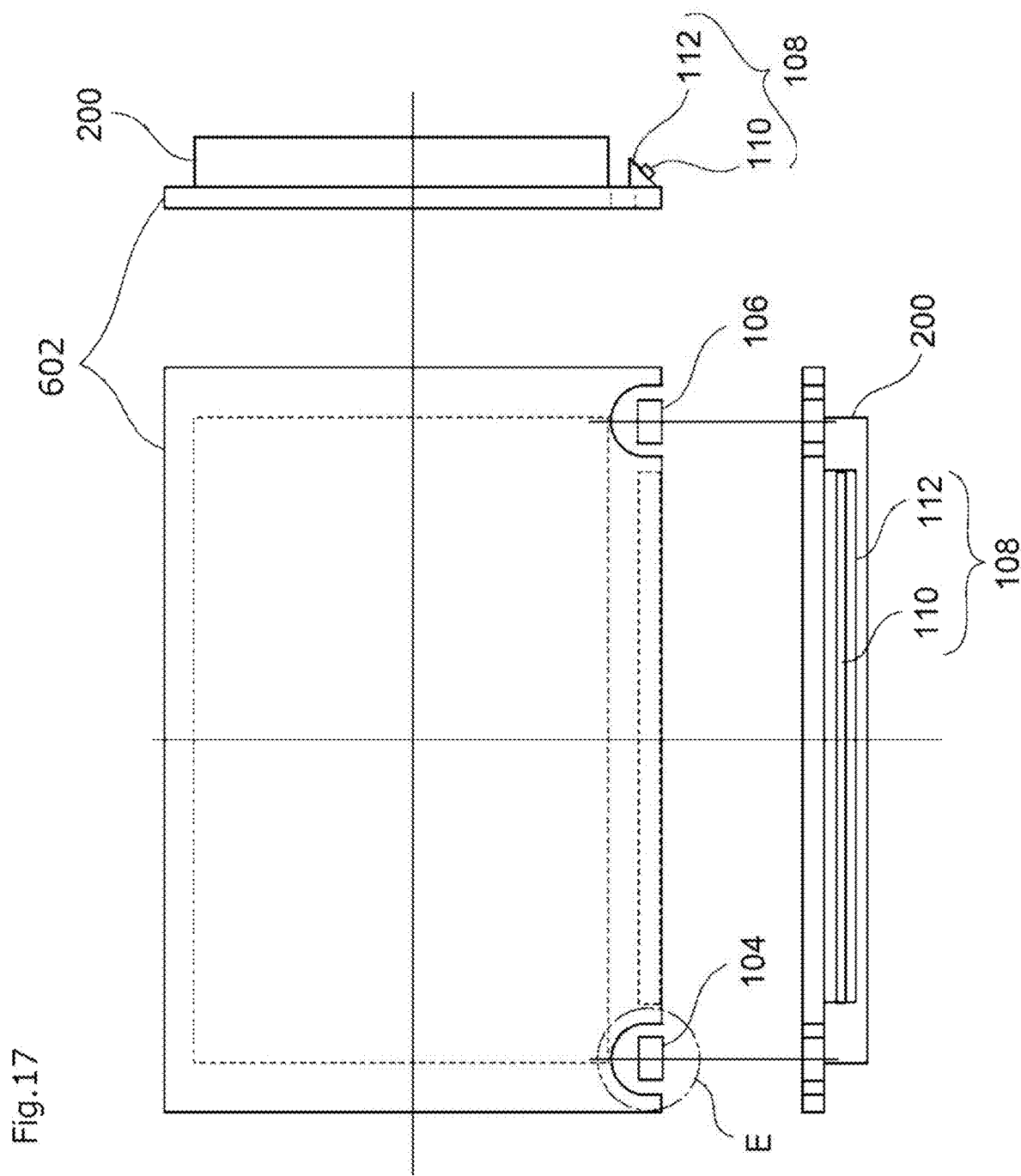
FIG. 17 is a three-plane drawing showing a configuration of the touch panel device of FIG. 16.

As shown in FIG. 17, the light source unit 108 includes the LED array unit 110 and the triangular prism 112. The LED array unit 110 is structured so that a plurality of LED elements are arrayed on the substrate. The triangular prism 112 are joined to the light guide plate 102 and the LED elements are attached to the slope of the triangular prism 112. The slope of the triangular prism 112 forms a predetermined angle to the plane of the light guide plate 602. Preferably, the predetermined angle is larger than an angle that light emitted from the LED elements in the front direction of the LED elements causes total reflection within the light guide plate 602, i.e. critical angle. The critical angle is decided by a refractive index of the light guide plate 602 and that of air. When the light guide plate 602 is made of acrylic resin (refractive index 1.49) preferably, the predetermined angle is about 50°

The light source unit 108 receives power supply and control from the light source control unit 116 and radiates the light from the LED elements of the LED array unit 110. The radiated light is infrared radiation having a wavelength of 850 nm. The light radiated from the LED array unit 110 is incident on the light guide plate 602 through the triangular prism 112 and propagates through the light guide plate 602 with repeating the total reflection by the both edges of the light guide plate 602. FIG. 16 schematically shows the light radiated from the light source unit 108 and propagating through the light guide plate 602 by three broken line arrows to the right upside.

As shown in FIG. 16, when a user touches the surface of the light guide plate 602 by his finger 220 or the like, the light radiated from the light source unit 108 and propagating through the light guide plate 602 is scattered at its touch location. A part of the scattered light is propagated to the first sensor unit 104 and the second sensor unit 106 (as shown by a broken line arrow downward in FIG. 16).

Each of the first sensor unit 104 and the second sensor unit 106 includes a photo detector device including CCD or CMOS sensor, or the like. The first sensor unit 104 and the second sensor unit 106 are responsive to the control by the sensor control unit 114 for transmitting a detection signal to the primary control unit 118. The primary control unit 118 includes a computing element including CPU or the like, and a memory element. As described later, for example, the photo detector device is a one-dimensional line sensor. The primary control unit 118 computes the touch location on the basis of information of the photo-detected position on the line sensor.

When the primary control unit 118 drives the light source unit 108 at a predetermining timing by the light source control unit 116 and radiates the light to the inside of the light guide plate 602, the primary control unit 118 waits to receive the detection signals from the first sensor unit 104 and the second sensor unit 106. When the surface of the light guide plate 602 is touched, as described above, the scattered light is caused at the touch location so that the scattered light is detected by the first sensor unit 104 and the second sensor unit 106, and the primary control unit 118 can compute the touch location. The primary control unit 118 outputs, through a predetermined interface, the information of the touch location to the host device 204 including a computer or the like, so that the host device 204 performs appropriate process according to the touch location.

As shown in FIG. 16, when the touch panel device 600 is arranged on the display panel 200 including a liquid crystal display or the like, the touch operation to the touch panel device 600 can be treated as a user's operation to any picture image displayed on the display panel 200 and a user's interface to the host device 204 can be embodied. For example, if the host device 204 is an image forming apparatus, the touch panel device 600 and the display device (the display panel 200 and the display control unit 202) can be used as an operation panel for the image forming apparatus.

Figure 18:
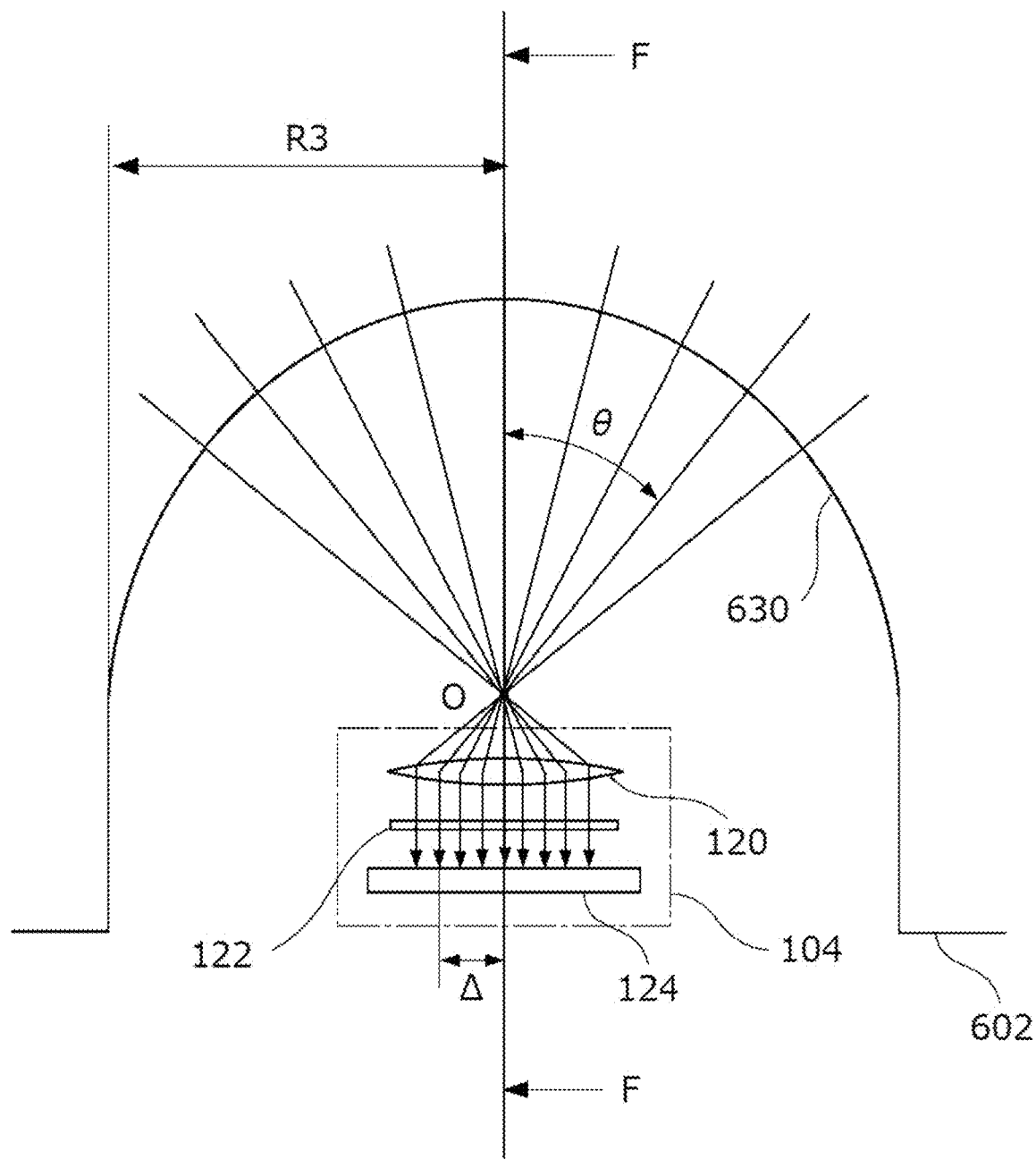
FIG. 18 is a plan view of the touch panel device with enlarging the region E of FIG. 17.
Figure 19:
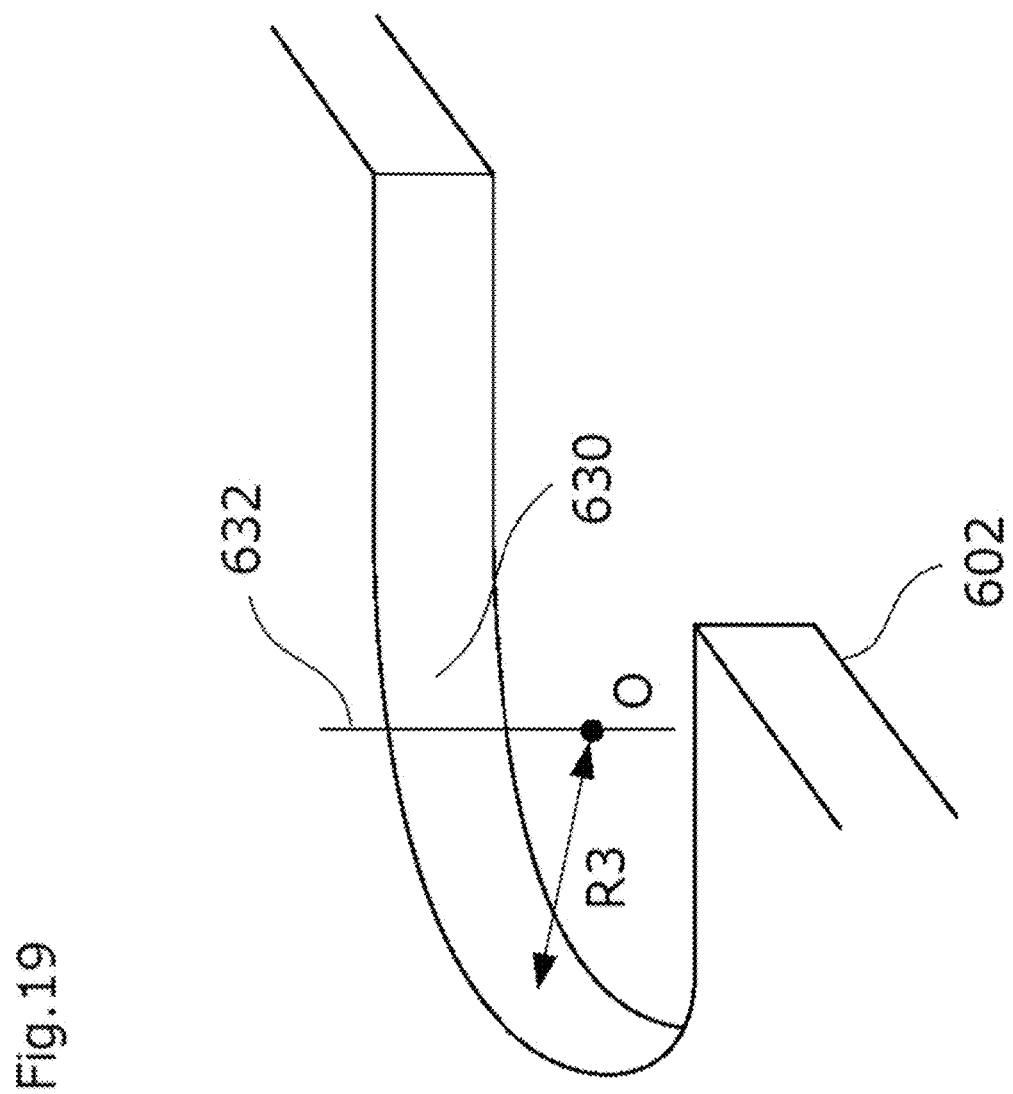
FIG. 19 is a perspective view of the touch panel device with enlarging a part of the light guide plate of the touch panel device shown in FIG. 16.
Figure 20:
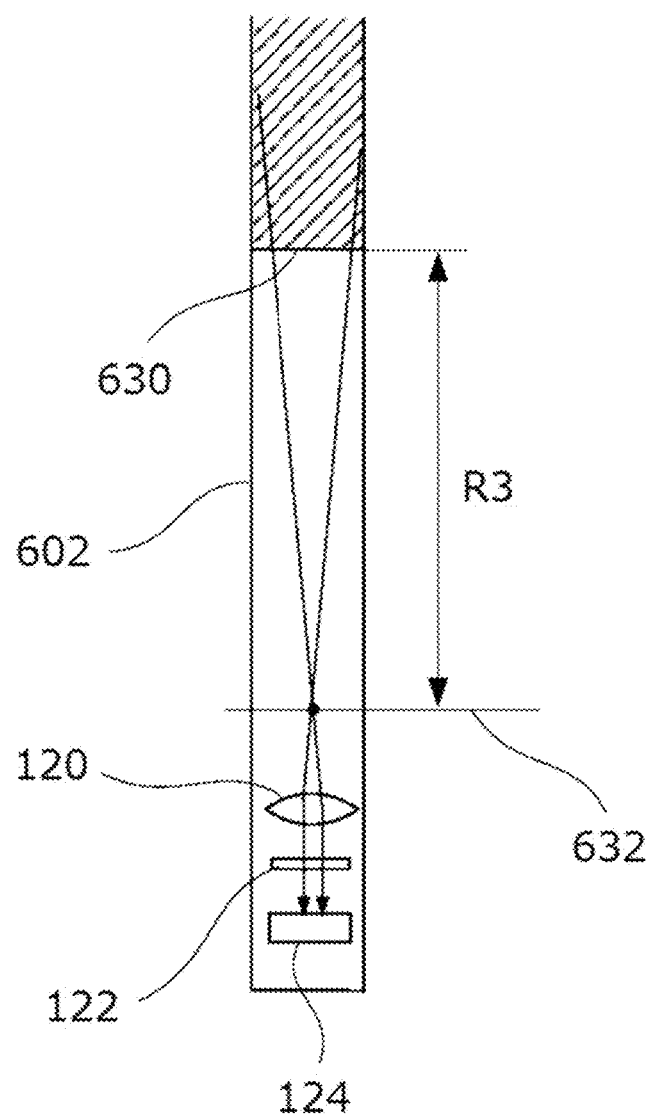
FIG. 20 is a sectional view of the touch panel device taken along an F-F line of FIG. 18.

As shown in FIGS. 18-20, according to this embodiment of the present invention, the position of the light guide plate 602 in which the first sensor unit 104 and the second sensor unit 106 are provided with a concave having an arc-shaped curved surface 630 of which the center of the circle is the point O. The arc-shaped curved surface 630 is vertical to the surface of the light guide plate 602. The points on the arc-shaped curved surface 630 are positioned to be in an equal distance (R3) from the axis 632 which passes the point O and is vertical to the surface of the light guide plate 602. That is, the arc-shaped curved surface 630 forms a part of a side of a cylinder of which the central axis is the axis 632 and of which the radius is R3.

With reference to FIG. 18, the first sensor unit 104 includes the lens unit 120, the band-pass filter 122 and the sensor 124. The sensor 124 is the aforementioned photo detector device, e.g. a line sensor. The band-pass filter 122 has a wavelength enough to optionally pass the light radiated from the light source unit 108. The band-pass filter 122 is provided for preventing another light other than the light radiated from the light source unit 108 (surrounding light incident on the light guide plate 102) from being incident on the sensor 124 and from being detected, erroneously.

The lens unit 120 is provided for focusing the light passing through the arc-shaped curved surface 630 and entering the light to the sensor 124. In FIG. 18 etc., the lens unit 120 is drawn as a convex lens and it is because this means an optical lens. The lens unit 120 comprises a combination of a plurality of lenses, i.e. a known f-θ lens.

With respect to the lens unit 120 and the sensor 124, it is preferable that the detection plane of the sensor 124 is vertical to an optical axis of the lens unit 120, the center of the detection plane of the sensor 124 is positioned on the optical axis of the lens unit 120, and the detection plane of the sensor 124 is positioned within the thickness of the light guide plate 602. More preferably, the optical axis of the lens unit 120 is positioned to pass the center in thickness direction of the light guide plate 602. With this arrangement, by using f-θ lens, an incident angle θ (rad) of the light to the optical axis of the lens is proportional to a distance A from the center of the sensor 124 to the detection point of the light, the sensor being a line sensor in which detecting elements are arranged lineally (see, FIG. 18). Therefore, on the basis of the detection point of the light on the sensor 124, the incident angle θ of the light detected can be computed, easily.

Since the edge of the light guide plate 602 facing the lens unit 120 is provided with an arc-shaped curved surface, the light entering from the normal direction of the arc-shaped curved surface 630 to the arc-shaped curved surface 630 is focused to the axis 632. However, another light entering from a direction other than the normal direction of the arc-shaped curved surface 630 to the arc-shaped curved surface 630 is reflected by the arc-shaped curved surface 630 or is not focused to the axis 632 even passing through the arc-shaped curved surface 630, so that it is impossible for another light to be incident on the lens unit 120. That is, among the scattered light caused by the touch operation, the light positioned in the linear direction connecting the touch location to the first sensor unit 104 and the second sensor unit 106 is optionally focused and entered to the lens unit 120. Therefore, the contour of the light detected can be clarified more than the conventional case, so that the precision of detecting the touch location by the sensor 124 can be improved.

Figure 21:
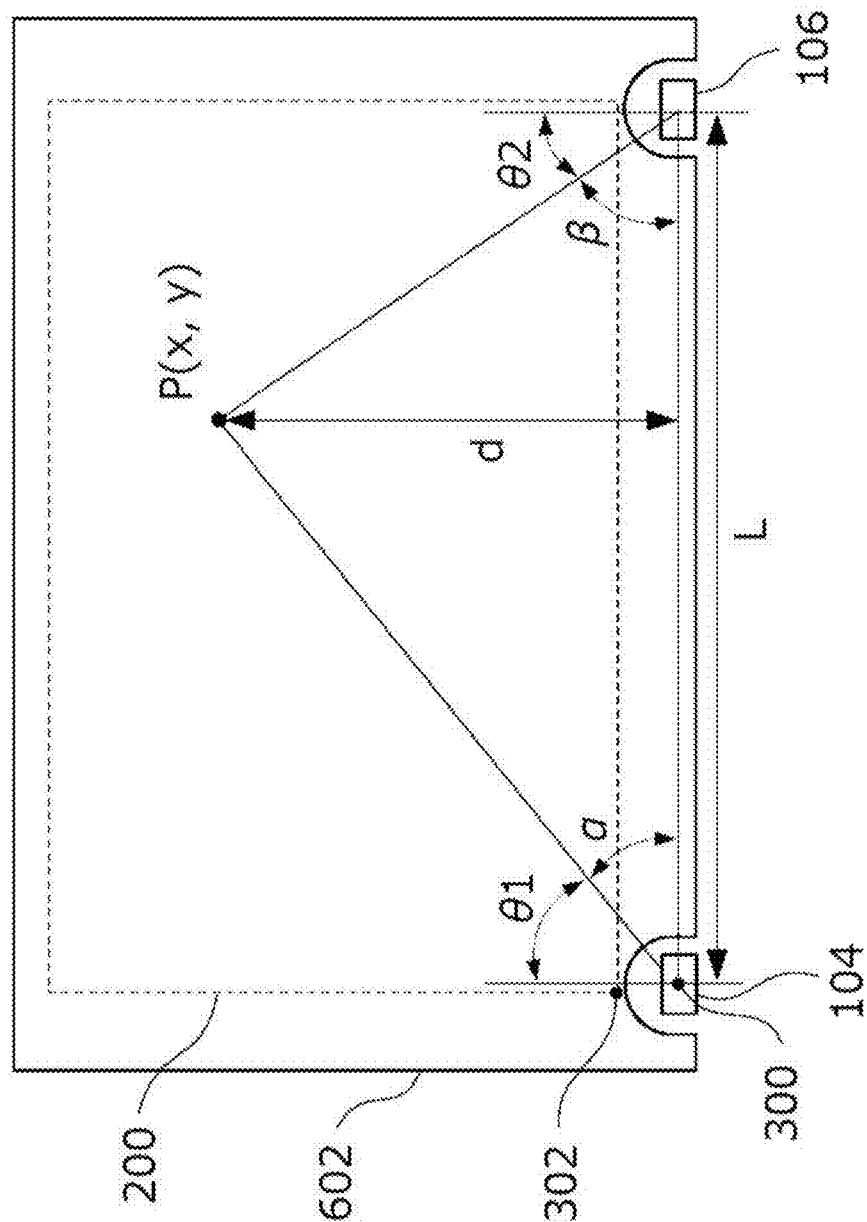
FIG. 21 is a plan view of the touch panel device showing a computing method of a touch location.

The second sensor unit 106 is structured as the first sensor unit 104 and has the same function as it. With reference to FIG. 21, on the basis of the points detected by the first sensor unit 104 and the second sensor unit 106, the incident angle θ1 (rad) and the incident angle θ2 (rad) of the corresponding light can be computed. From the incident angle θ1 and the incident angle θ2, angles α (rad) and β (rad) formed between the light and a line connecting the first sensor unit 104 and the second sensor unit 106 can be calculated. That is, the angles α and β are calculated by α=π/2−θ1, β=π/2−θ2. When it is defined that the touch location is P, a distance from the line connecting the first sensor unit 104 and the second sensor unit 106 to the touch location is d, and a distance between the first sensor unit 104 and the second sensor unit 106 is L, a formula L=d/tan α+d/tan β. Using this formula, the angles α and β, and the distance L between the first sensor unit 104 and the second sensor unit 106 are substituted for the formula to calculate the distance d and then the position coordinate (x, y) of the touch location P can be decided. That is, when the distance d is calculated, y is decided by y=d, x is decided by x=d/tan α. The value of the distance L is preliminarily stored in the internal memory of the primary control unit 118.

The calculated position coordinate (x, y) is a position coordinate in a coordinate system of the first sensor unit 104 and the second sensor unit 106, e.g. a coordinate system at the origin of point 300. If the touch point P is represented, e.g. as a position coordinate in the display panel 200, coordinate transformation that the origin is shifted in parallel from the point 300 to another point 302 is performed to the calculated position coordinate (x, y). The parameters necessary for the coordinate transformation are preliminarily stored in the internal memory of the primary control unit 118.

As described above, the portion of the light guide plate 602 facing the lens unit 120 is provided with the arc-shaped curved surface 630, so that the detection precision of the touch location detected by the sensor 124 of each of the first sensor unit 104 and the second sensor unit 106 is very high and the precision of calculating the angles α and β is very high, also. Therefore, the precision of detecting the touch location P is very high.

Fifth Embodiment

The edge of the light guide plate 602 facing each of the first sensor unit 104 and the second sensor unit 106 is provided with the arc-shaped curved surface along the normal line of the surface of the light guide plate 602 in the firth embodiment of the present invention. In contrast, in a fifth embodiment of the present invention, a slope crossing the normal line of the surface of the light guide plate 602 is provided. The touch panel device according to this embodiment is structured as the touch panel device 600 according to the forth embodiment and has the same function as it.

Figure 22:
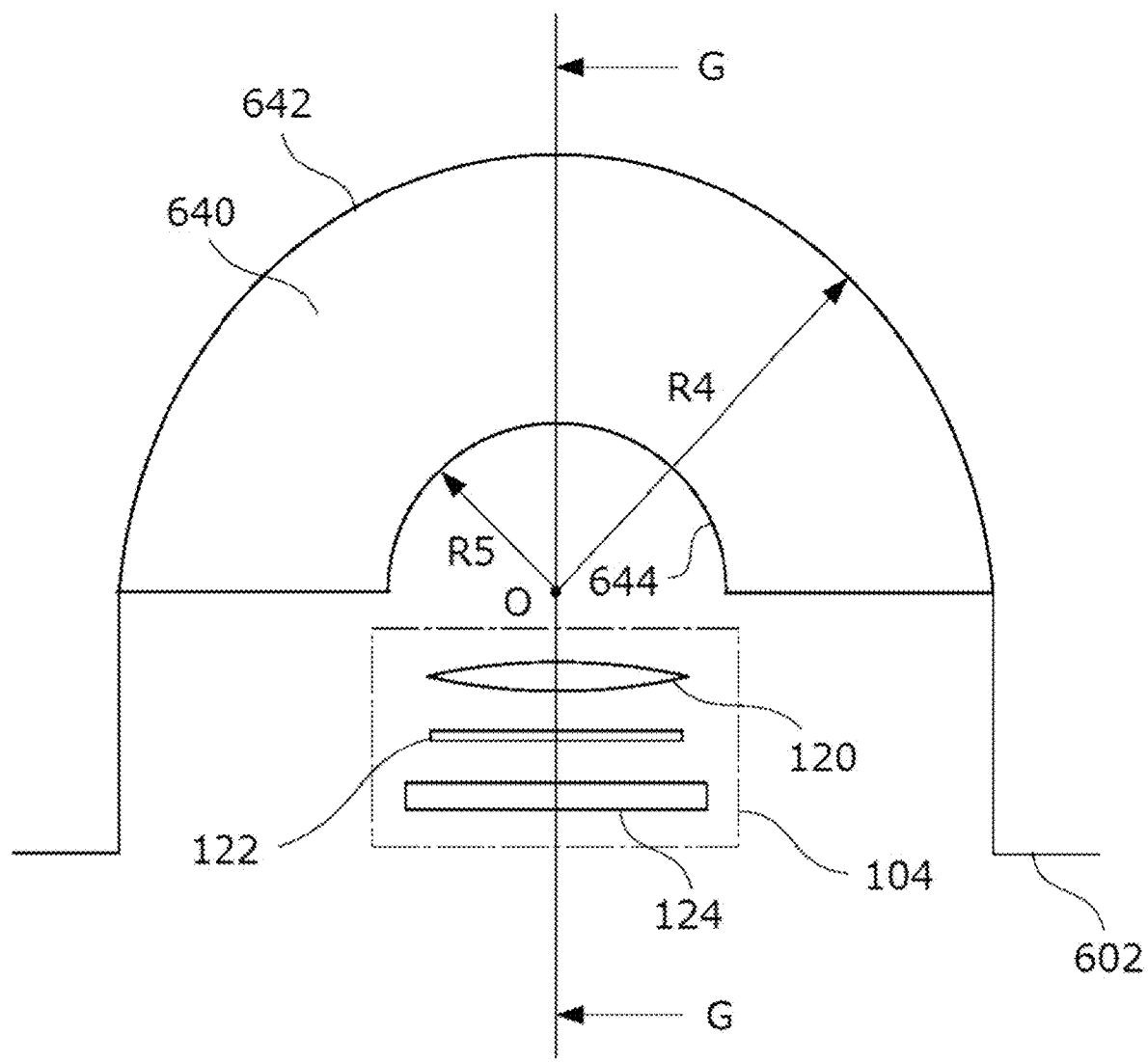
FIG. 22 is a plan view of a touch panel device with enlarging a part of the touch panel device according to a fifth embodiment of the present invention.
Figure 23:
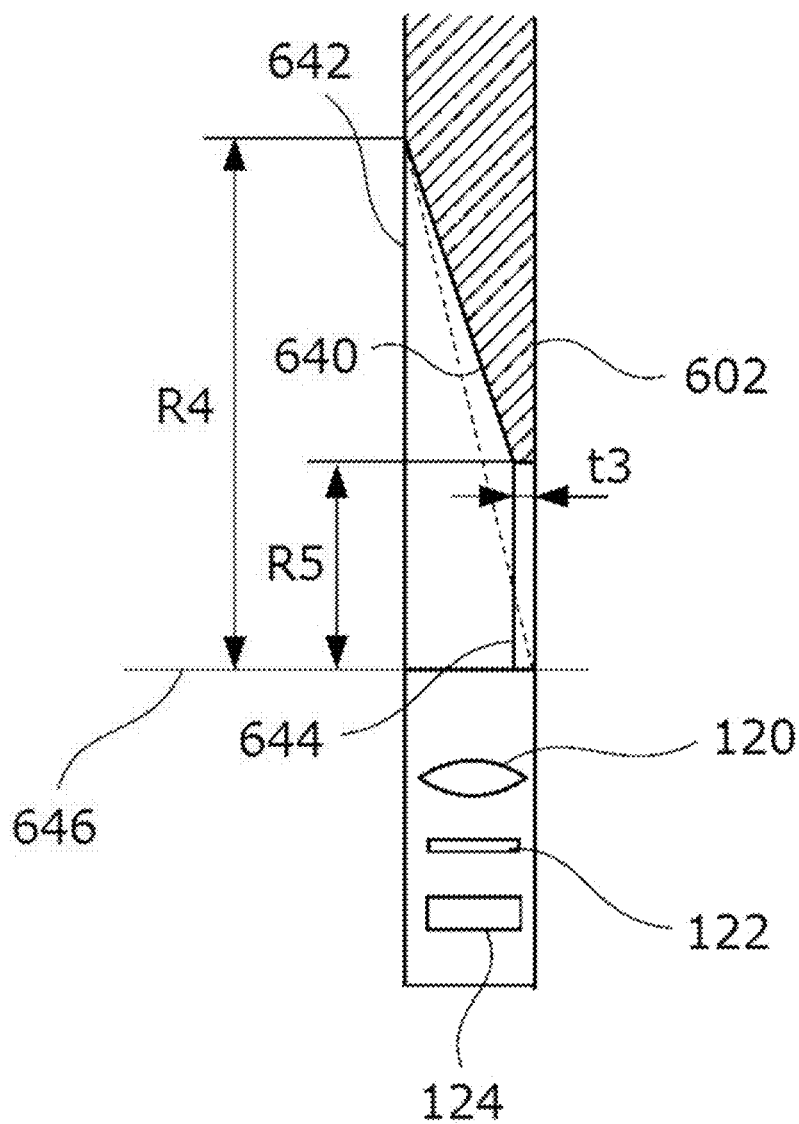
FIG. 23 is a sectional view of the touch panel device taken along a G-G line of FIG. 22.

In the touch panel device according to this embodiment, the edge of the light guide plate 602 facing each of the first sensor unit 104 and the second sensor unit 106 is structured as shown in FIGS. 22 and 23. As the fourth embodiment, the first sensor unit 104 includes the lens unit 120, the band-pass filter 122 and the sensor 124.

The edge of the light guide plate 602 facing each of the first sensor unit 104 and the second sensor unit 106 is provided with a slope 640 so as to form a part of a conical surface (surface of a cone). That is, the slope 640 forms a part of the conical surface of which the central axis is the axis 646 vertical to the surface of the light guide plate 602. The slope 640 is decided by a radius R4 of an outer arc-shaped curve 642, a radius R5 of an inner arc-shaped curve 644, and a thickness t3 of a portion of an inner arc-shaped curve (a distance between the inner arc-shaped curve 644 and the rear surface of the light guide plate 602). The portion of the thickness t3 is an arc-shaped curved surface forming a part of the side of a cylinder of which the central axis is the axis 646 and of which the radius is R5. In addition, as shown by the broken line in the sectional view of FIG. 23, the radius R5 and the thickness t3 of the inner arc-shaped curve 644 may be 0 (zero).

Figure 24:
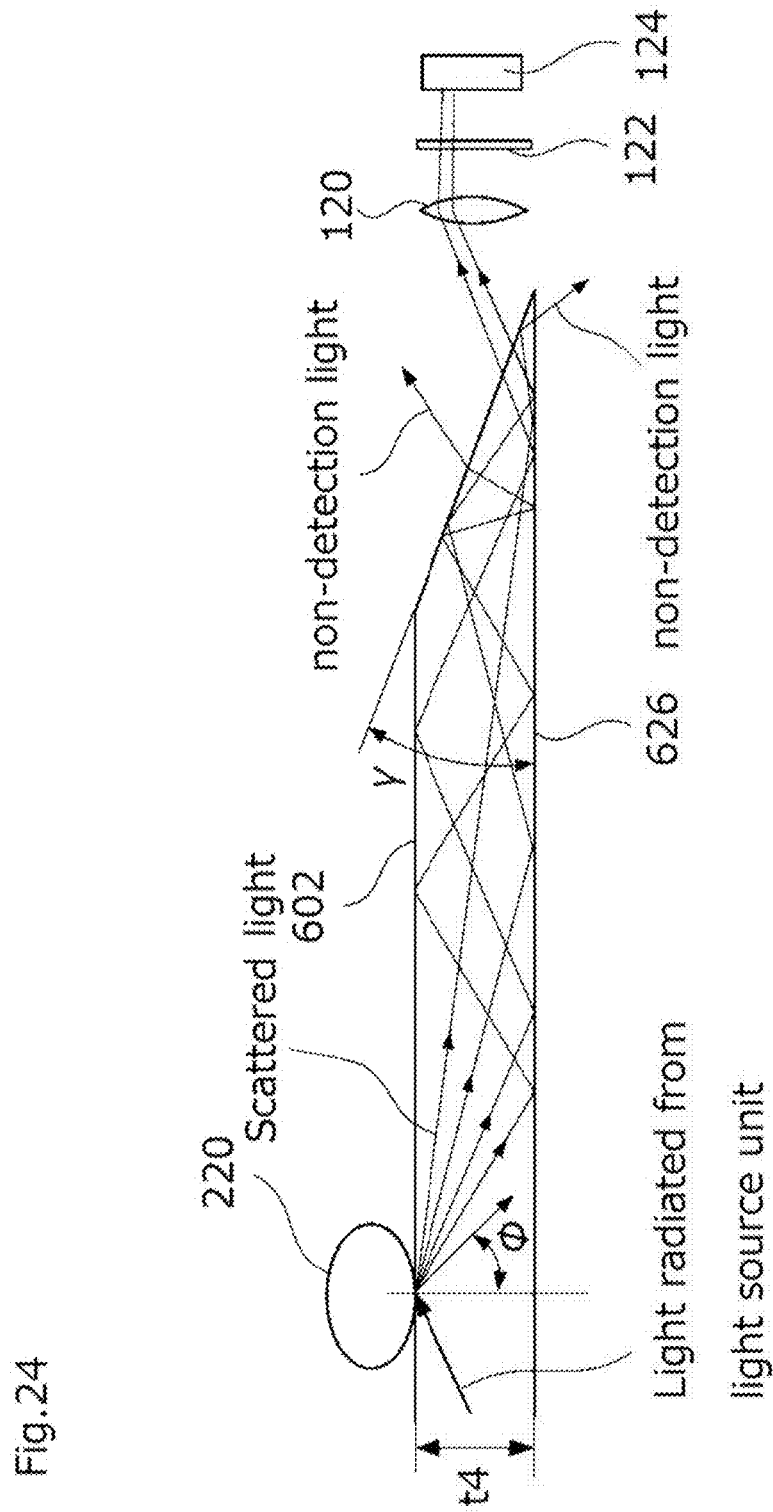
FIG. 24 is a diagram showing paths of the scattered light propagating through the inside of the light guide plate.

FIG. 24 is a diagram showing paths (optical paths, hereinafter) of the scattered light propagating through the inside of the light guide plate 602 of the touch panel device according to this embodiment of the present invention. The light guide plate 602 of FIG. 24 corresponds to the shape (R5=0, t3=0) shown by the broken line in FIG. 23.

As shown in FIG. 24, the scattered light caused when a user touches the surface of the light guide plate 602 by his finger 220 or the like is propagated to the inside of the light guide plate 602, and then emitted from the slope 640 outside the light guide plate 602, and entered into the lens unit 120. At this time, there is light which is not incident on the lens unit 120 among the light radiated from the slope 640. In FIG. 24, such light which is not incident on the lens unit 120 is denoted by "nondetection light". Further, a part of the scattered light is emitted from a surface other than the slope 640. This light is not incident on the lens unit 120 and is the nondetection light.

In what direction the scattered light propagating through the inside of the light guide plate 602 is emitted from the slope 640, and a proportion that the scattered light is emitted from a surface other than the slope 640 depend on a thickness t4 of the light guide plate 602; a material (refractive index) of the light guide plate 602; and an angle of inclination γ of the slope 640 (an angle in a plane including the axis 646). To make the strength of the light incident on the lens unit 120 to be appropriate largeness, it is necessary to set the angle of inclination γ appropriate dependent on the material and thicknesses of the light guide plate 602.

The optical paths are simulated by changing an angle of scatter φ under the condition that the material of the light guide plate 602 is used as acrylic resin (PMMA) (refractive index 1.49) and the thickness t4. The thickness t4 of the light guide plate 602 is 2 mm, for example. As a result, preferably, the angle of inclination γ of the slope 640 is in the range of about 10-40°. More preferably, the angle of inclination γ is in the range of about 15-25°. When the angle of inclination γ is less than 10°, the scattered light of which the angle of scatter φ is larger is of total reflection by the slope 640 even if it reaches the slope 640, and emitted from the rear surface 626 of the light guide plate 602, so that it cannot reach the lens unit 120. On the other hand, when the angle of inclination γ is larger than 40°, a major part of the scattered light is emitted from the slope 640, but much light is emitted to the upside of the light guide plate 602 (the front side of the touch panel device) and sufficient light cannot reach the lens unit 120.

The same effect as the fourth embodiment can be offered by the light guide plate 602 providing with the slope 640 of an appropriate angle of inclination γ. That is, the lens unit 120 focuses the light passing through the slope 640 and enters it to the sensor 124. The lens unit 120 comprises e.g. a known f-θ lens. On the basis of the detection point of the light on the sensor 124, the incident angle θ of the light detected can be computed, easily.

Since the edge of the light guide plate 602 (the slope 640) facing the lens unit 120 is provided with a conical surface, the light propagating through the plane including the axis 646 among the light entering to the slope 640 is focused to the axis 646. However, another light entering to the slope 640 from other than the plane including the axis 646 is reflected by the slope 640 or is not focused to the axis 646 even passing through the slope 640, so that it is impossible for another light to be incident on the lens unit 120. That is, among the scattered light caused by the touch operation, the light positioned in the linear direction connecting the touch location to the first sensor unit 104 and the second sensor unit 106 is optionally focused and entered to the lens unit 120. Therefore, the contour of the light detected can be clarified more than the conventional case, so that the precision of detecting the touch location by the sensor 124 can be improved.

The second sensor unit 106 is structured as the first sensor unit 104 and has the same function as it. Therefore, as the fourth embodiment, on the basis of the points detected by the first sensor unit 104 and the second sensor unit 106, regarding to the corresponding light, the angles α and β can be obtained and the position coordinate (x, y) of the touch location P can be decided. At this time, since the slope is provided at the edges of the light guide plate 602 facing the lens unit 120, the detection precision of the touch location detected by the sensor 124 of each of the first sensor unit 104 and the second sensor unit 106 is very high and the precision of calculating the angles α and β is very high, also. Therefore, the precision of detecting the touch location P is very high.

Sixth Embodiment

In the sixth embodiment, a reflection plate is provided to increase the scattered light incident on the first sensor unit 104 and the second sensor unit 106 more than in the fifth embodiment, and to prevent the scattered light from leaking.

The touch panel device according to this embodiment is structured as the touch panel device 600 according to the forth embodiment and has the same function as it. The reference numerals of FIGS. 16 and 17 are referred to hereinafter. The shape of the edge of the light guide plate 602 facing each of the first sensor unit 104 and the second sensor unit 106 is the same as the fifth embodiment.

Figure 25:
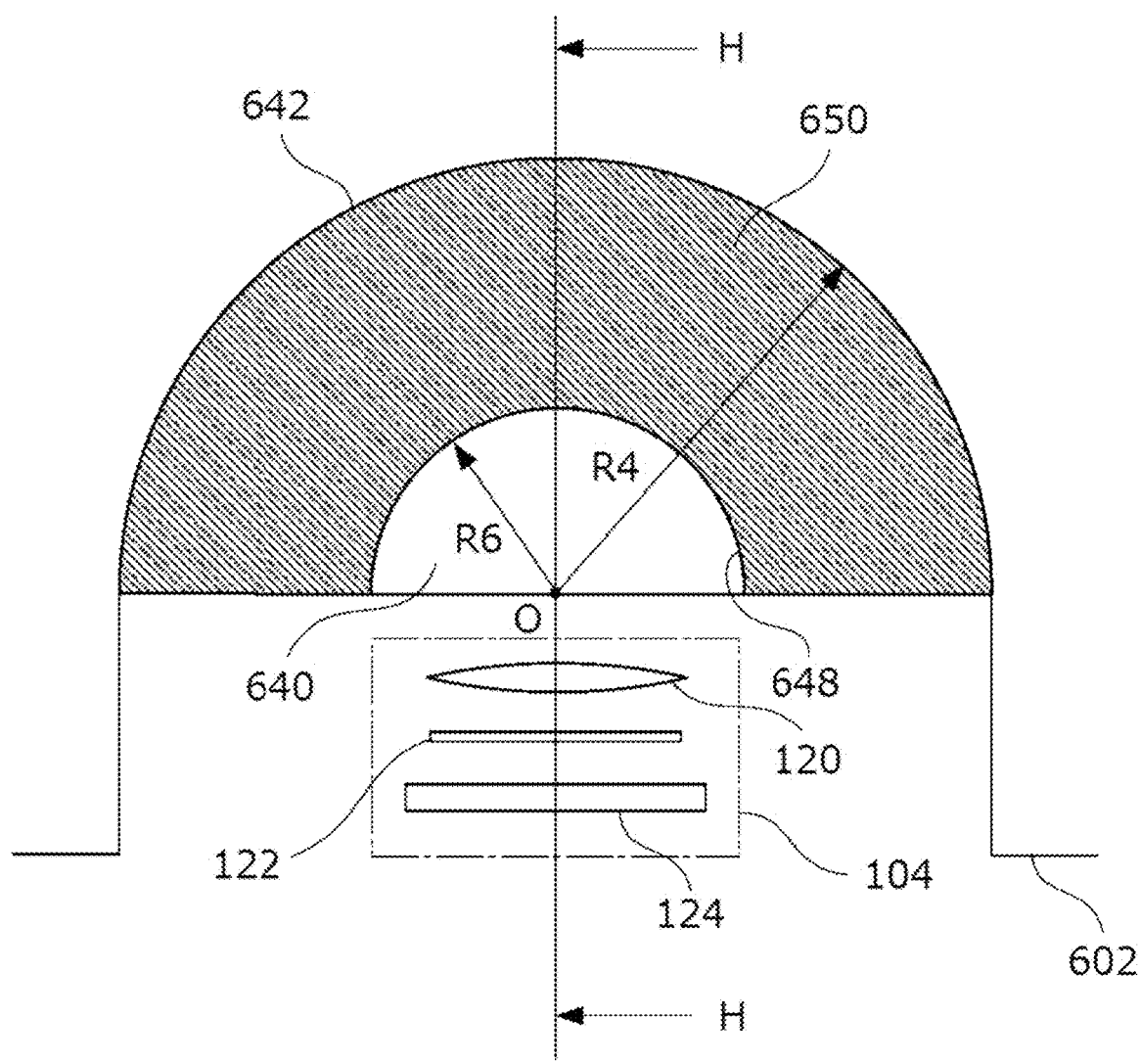
FIG. 25 is a plan view of a touch panel device with enlarging a part of the touch panel device according to a sixth embodiment of the present invention.
Figure 26:
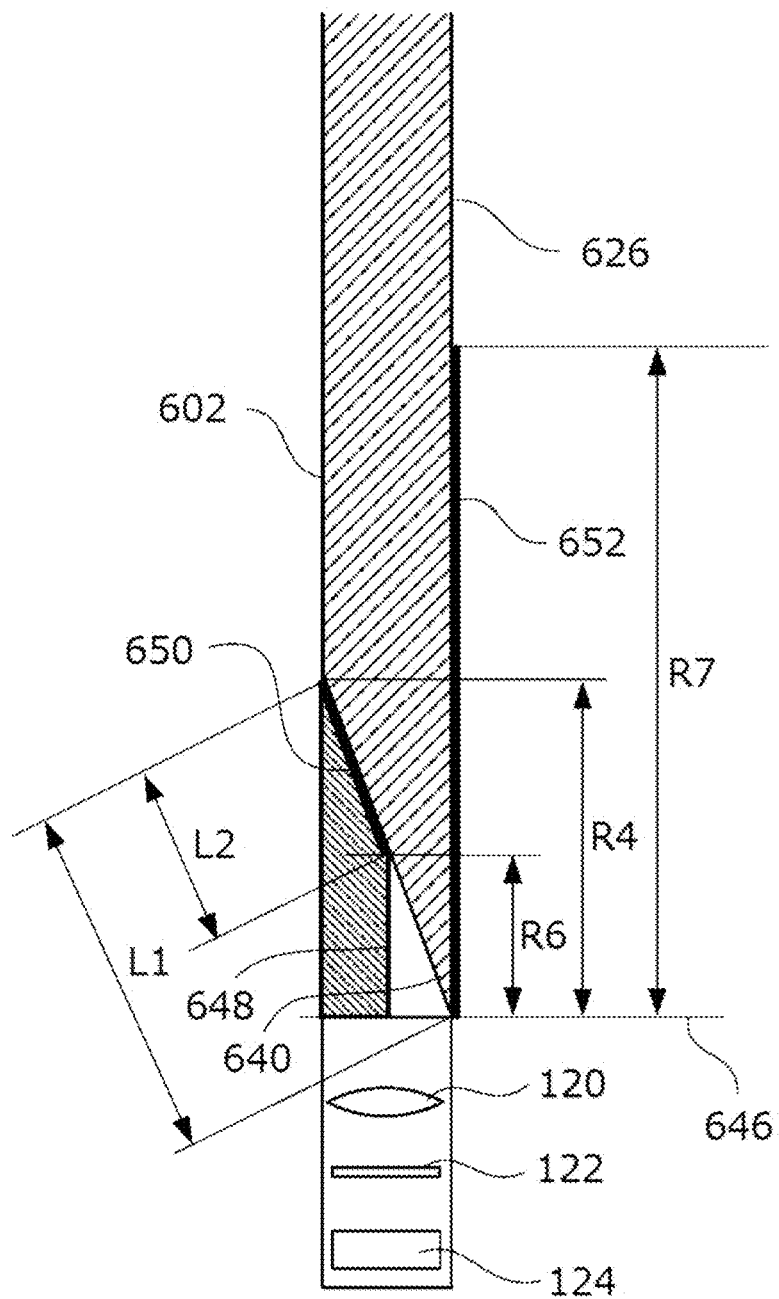
FIG. 26 is a sectional view of the touch panel device taken along an H-H line of FIG. 25.
Figure 27:
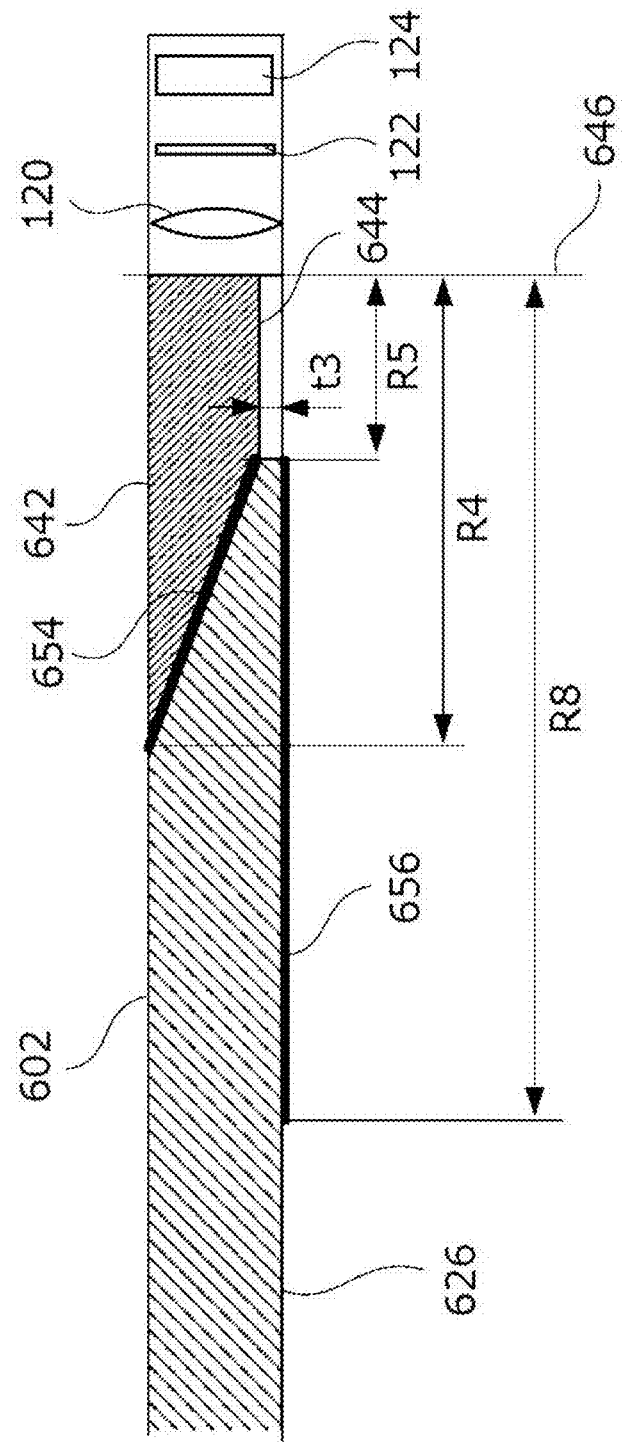
FIG. 27 is a sectional view of the touch panel device including a reflection plate formed on a light guide plate of which the shape is different from the light guide plate of FIG. 26.

In the touch panel device according to this embodiment, the edge of the light guide plate 602 facing the first sensor unit 104 and the second sensor unit 106 is structured as shown in FIGS. 25 and 26. As the forth embodiment, the first sensor unit 104 includes the lens unit 120, the band-pass filter 122 and the sensor 124.

The edge of the light guide plate 602 facing the first sensor unit 104 and the second sensor unit 106 is provided with the slope 640 so as to form a part of a conical surface (surface of a cone). That is, the slope 640 forms a part of the conical surface of which the central axis is the axis 646 vertical to the surface of the light guide plate 602. The slope 640 is decided by a radius R4 of an outer arc-shaped curve 642. The shape of the light guide plate 602 shown in FIGS. 25 and 26 corresponds to the shape (R5=0, t3=0) of the inner arc-shaped curve 644 shown by the broken line in FIG. 23.

A first reflection plate 650 is provided on the slope 640 formed on the light guide plate 602 and a second reflection plate 652 is provided on a rear surface 626 of the light guide plate 602. As the slope 640, the first reflection plate 650 forms a part of the conical surface of which the central axis is the axis 646 vertical to the surface of the light guide plate 602. The first reflection plate 650 is decided by the radius R4 of the outer arc-shaped curve 642 and a radius R6 of an inner arc-shaped curve 648. The second reflection plate 652 is a semicircle of a radius R7

The first reflection plate 650 and the second reflection plate 652 are made by coating a mirror-making paint, e.g. "mirror spray", product no. MS-80 produced by Acrysunday Co. at a predetermined thickness. The mirror-making paint contains fine metal particles (e.g. aluminum particles) and makes a mirror for reflecting the light when it is cured.

The first reflection plate 650 and the second reflection plate 652 may be made by a known method including evaporation or sputtering of aluminum, or the like.

As discussed in the fourth embodiment, to make the strength of the light incident on the lens unit 120 to be appropriate largeness, it is necessary to set the angle of inclination γ appropriate dependent on the material and thicknesses of the light guide plate 602. Even if the angle of inclination γ of the slope 640 is set in a preferable range (about 10-40°, more preferably, about 15-25°), a part of the scattered light is emitted from a rear surface 626 of the light guide plate 602 and is not incident on the lens unit 120 as the nondetection light. Further, a part of the scattered light radiated from the slope 640 is emitted to the upside of the light guide plate 602 (the front side of the touch panel device) and is the nondetection light which cannot reach the lens unit 120.

Thus, without the second reflection plate 652, some light which is emitted from the rear surface 626 of the light guide plate 602 is the nondetection light. However, according to this embodiment, with the second reflection plate 652, such light can be reflected by the second reflection plate 652 and then be propagated through the light guide plate 602. Further, without the first reflection plate 650, some light which is emitted from the slope 640 of the light guide plate 602 to the upside of the light guide plate 602 is the nondetection light. However, according to this embodiment, with the first reflection plate 650, such light can be reflected by the first reflection plate 650 and then be propagated through the light guide plate 602. Therefore, the loss of the scattered light due to the emission, in an inappropriate direction, from the rear surface 626 and the slope 640 can be reduced, and the light incident on the lens unit 120 can be increased. The light which is emitted from an exposed portion, without the reflection plate, of the slope 640 and incident on the lens unit 120 can be increased.

In case where the light guide plate 602 is as shown in FIG. 26, preferably, a length L2 of the first reflection plate 650 along the slope 640 is ½ (a half) of a length L1 of the slope 640 (R6 is ½ (a half) of R4), The radius R6 of the second reflection plate 652 may be larger than the radius R4 of the outer arc-shaped curve 642 of the first reflection plate 650.

Further, in case where shape of the light guide plate 602 is as shown in FIGS. 22 and 23, a third reflection plate 654 is formed on the entire surface of the slope 640 and a fourth reflection plate 656 is formed on the rear surface 626 of the light guide plate 602. The fourth reflection plate 656 is formed as a flat plate of a radius R8 of an outer arc-shaped curve and a radius R5 of an inner arc-shaped curve.

Then, being similar to FIG. 26, the loss of the scattered light due to the emission, in an inappropriate direction, from the rear surface 626 and the slope 640 can be reduced. By the third reflection plate 654 and the fourth reflection plate 656, the scattered light can be emitted from the surface-exposed portion of the arc-shaped curve in the light guide plate 602, and be incident on the sensor unit. For example, when the thickness t4 of the light guide plate 602 is 2 mm, preferably, t3=0.2-0.5 (mm).

(Variation 4)

Figure 28:
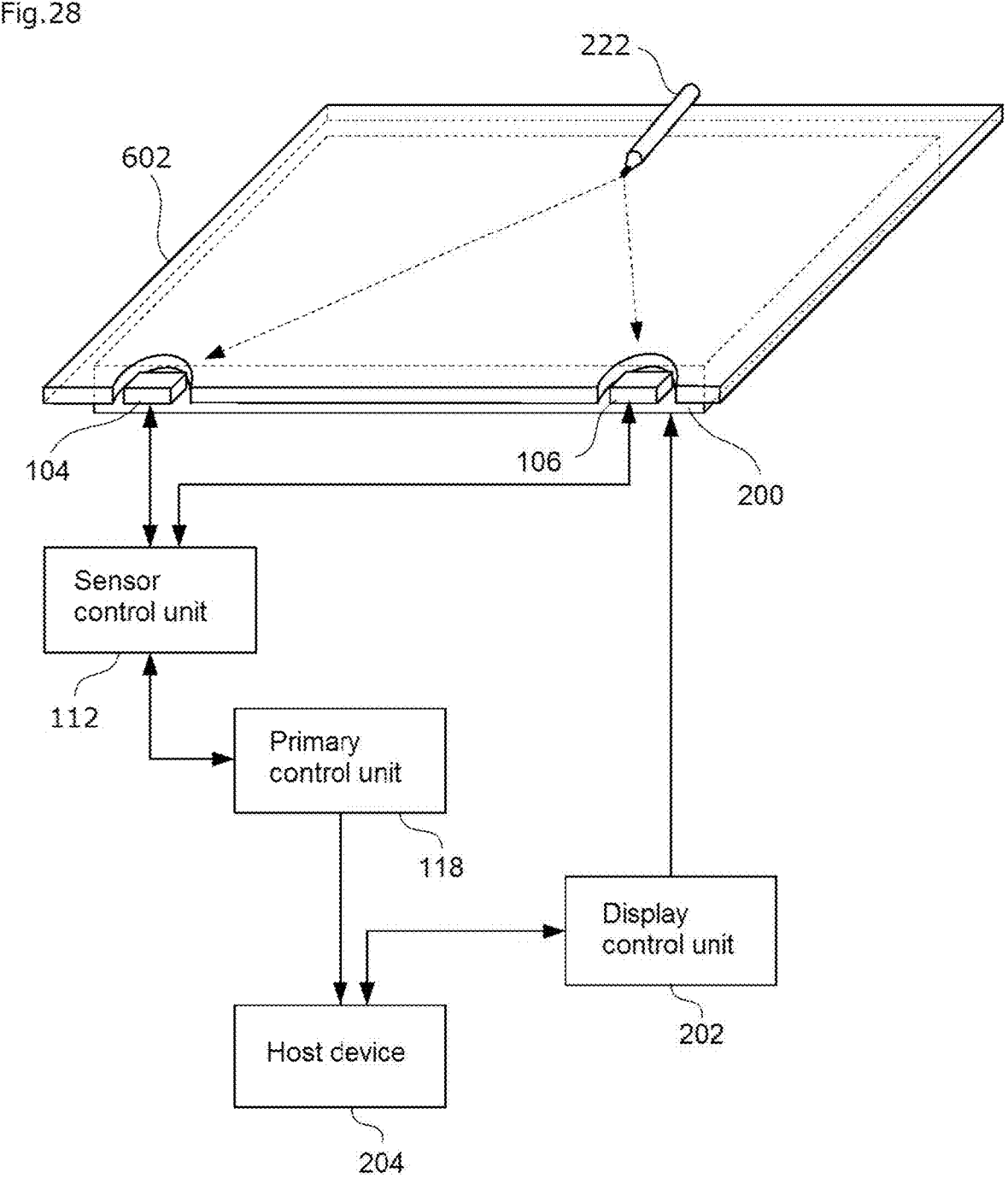
FIG. 28 is a schematic configuration diagram of the touch panel device using an LED pen.

In the above description, it is explained that the touch panel device 600 is provided with a light source unit, but the present invention should not be limited to this. When an LED pen for emitting light is used, it is not necessary to provide the light source unit. For example, the touch panel device shown in FIG. 28 is not provided with the light source unit 108 and the light source control unit 116 shown in FIG. 1. In this case, when a tip portion of an LED pen 222 is touched on the surface of the light guide plate 602, the light emitted from an LED element positioned at the tip portion is incident on the light guide plate 602. As the scattered light described above, the light entered to the light guide plate 602 is detected by the first sensor unit 104 and the second sensor unit 106, and the touch location by the LED pen 222 is calculated.

(Variation 5)

Figure 29:
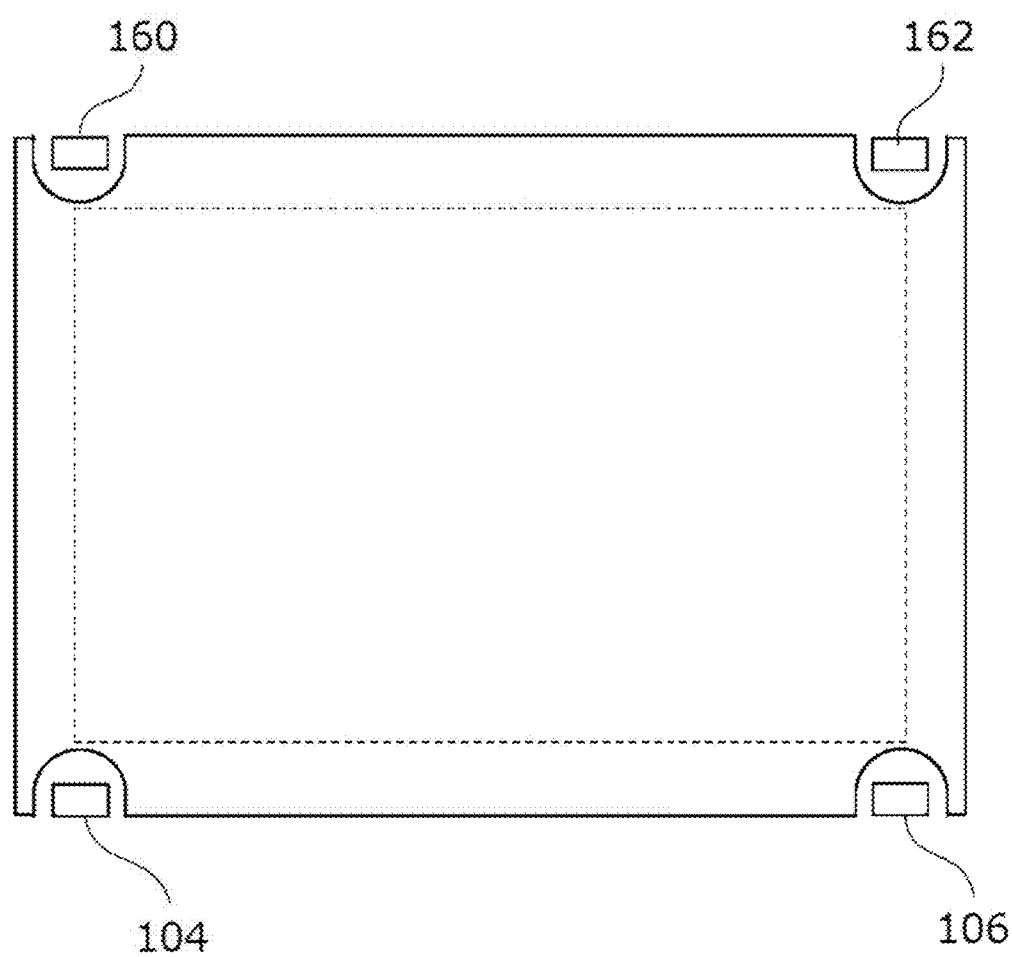
FIG. 29 is a plan view of a touch panel device which can detect touch locations by a plurality of LED pens, simultaneously.

In the above description, it is explained that the touch panel device 600 is provided with two sensor units, but the present invention should not be limited to this. For example, as shown in FIG. 29, the touch panel device may be provided with four sensor units. A third sensor unit 160 and a fourth sensor unit 162 are structured as the first sensor unit 104 and the second sensor unit 106. For example, when two kinds of LED pens are used and the wavelengths emitted from the LED elements are different from each other, the wavelength range of the band-pass filter for the first sensor unit 104 and the second sensor unit 106 is set to be different from the wavelength range of the band-pass filter for the third sensor unit 160 and the fourth sensor unit 162. Accordingly, when the two kinds of LED pens are used simultaneously, the touch location of each of the LED pens can be detected.

Specifically, the band-pass filter for the first sensor unit 104 and the second sensor unit 106 is set to pass the light emitted from the LED element of a first LED pen, but is set not to pass the light emitted from the LED element of a second LED pen. The band-pass filter for the third sensor unit 160 and the fourth sensor unit 162 is set to pass the light emitted from the LED element of the second LED pen, but is set not to pass the light emitted from the LED element of the first LED pen. Then, the touch location by the first LED pen can be detected by the first sensor unit 104 and the second sensor unit 106, and the touch location by the second LED pen can be detected by the third sensor unit 160 and the fourth sensor unit 162.

In the above fourth-sixth embodiments, the arc-shaped curved surface 630 and the slope 640 of the light guide plate 602 can be made by cutting the edges of the light guide plate of a rectangular flat plane. The arc-shaped curved surface 630 and the slope 640 of the light guide plate 602 may be made by injection molding.

In the above description, the light guide plate 602 is made of acrylic resin, but it should not be limited to this. It may be made of a material capable to propagate the light emitted from the light source unit or the LED pen in a low attenuation factor.

In the above description, it is explained that the arc-shaped curved surface 630 or the slope 640 is formed in an integrated light guide plate 602, but it should not be limited to this. It may be possible that a first portion of the light guide plate 602 where the arc-shaped curved surface 630 or the slope 640 is formed, and the remaining flat portion of the light guide plate 602 are individually made, and then the first portion and the second portion are adhered to each other by an adhesive. When the light guide plate 602 is made of acrylic resin (refractive index 1.49), to prevent the change of the refractive index in an optical joint portion, preferably, the adhesive is used by e.g. an ultraviolet curing adhesive of acrylic resin (refractive index 1.49). When the adhesive is used, preferably, they are joined under decompression to prevent air bubbles from generating in the optical joint portion. Further, when the refractive index of each of the first portion and the second portion is approximately the same, it may be possible to make them of a different material. For example, the first portion may be made of acrylic resin, and the second portion may be made of borosilicate glass (refractive index 1.48), they may be joined to each other by an ultraviolet curing adhesive of acrylic resin. Then, such a device can be applied to a large-sized display device.

In the above description, the lens unit 120 and the sensor 124 are arranged so that the optical axis of the lens unit 120 can pass the center of the detecting portion of the sensor 124, but it should not be limited to this. When the first sensor unit 104 and the second sensor unit 106 are arranged as shown in FIGS. 16 and 17, as being apparent from FIGS. 18 and 21, the sensor 124 of the first sensor unit 104 detects the light with a left-sided half region viewed from the touch surface of the light guide plate 602, and the sensor 124 of the second sensor unit 106 detects the light with a right-sided half region viewed from the touch surface of the light guide plate 602. Therefore, it may be possible to arrange the sensor 124 of the first sensor unit 104 so that the optical axis of the lens unit 120 can pass the right side of the detecting portion of the sensor 124 viewed from the touch surface of the light guide plate 602. Further, it may be possible to arrange the sensor 124 of the second sensor unit 106 so that the optical axis of the lens unit 120 can pass the left side of the detecting portion of the sensor 124 viewed from the touch surface of the light guide plate 602. Then, the detecting portion of the sensor can be effectively used to improve the detection precision (resolution).

Figure 30:
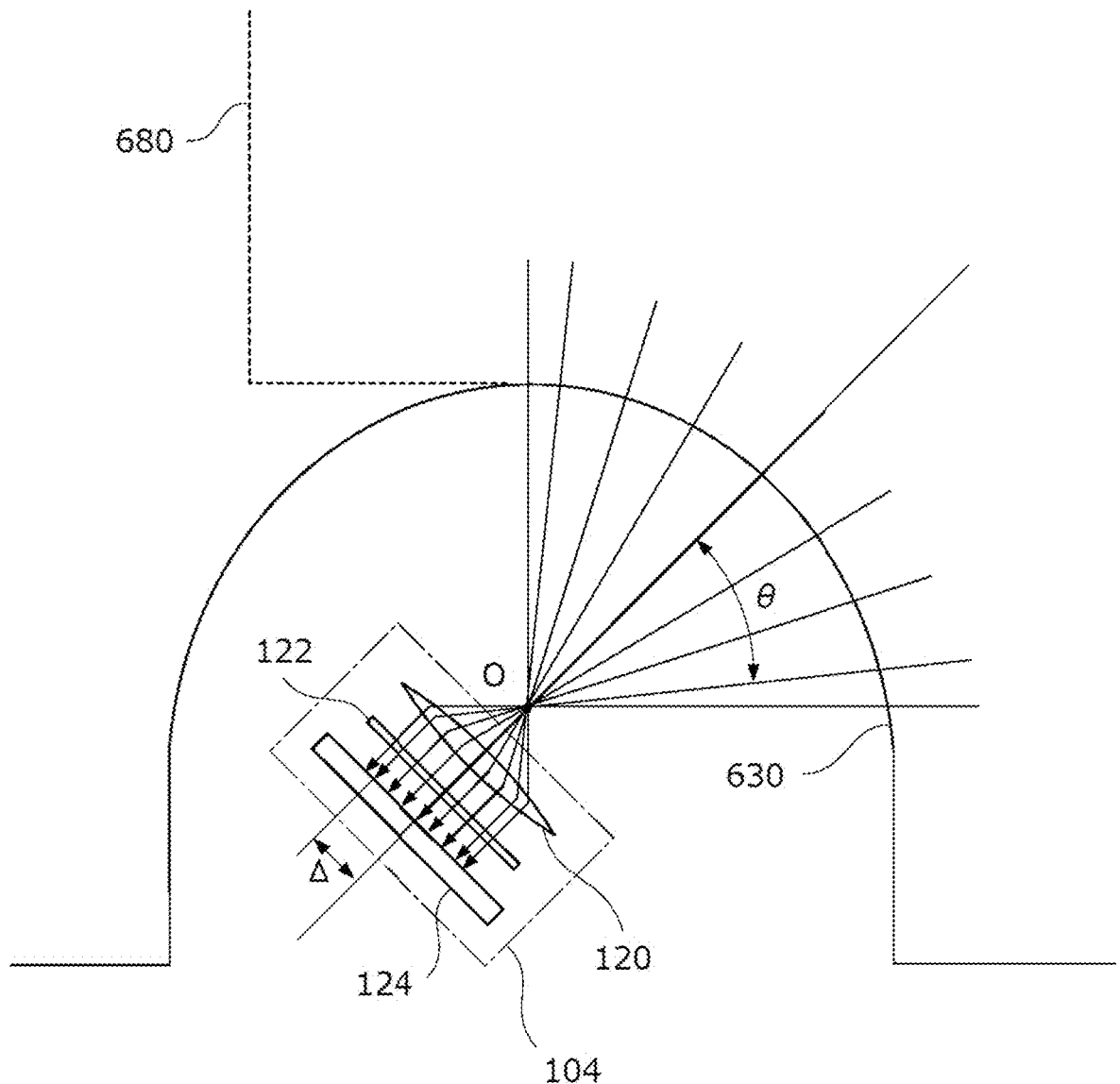
FIG. 30 is a plan view of the touch panel device including a sensor unit which is different from the sensor unit of FIG. 18.

As shown in FIG. 30, the first sensor unit 104 may be arranged to be rotated at a predetermined angle (e.g. 45°) counterclockwise. Similarly, the second sensor unit 106 may be arranged to be rotated at a predetermined angle (e.g. 45°) clockwise. When the first sensor unit 104 is arranged to be rotated at about 45°, preferably, the lens unit 120 and the sensor 124 are arranged so that the optical axis of the lens unit 120 passes the center of the detecting portion of the sensor 124. This is the same when the second sensor unit 106 is arranged to be rotated at about 45°. In order to effectively utilize the detecting portion of the sensor of the first sensor unit 104 and the second sensor unit 106, preferably, the position between the optical axis of the lens unit 120 and the detecting portion of the sensor 124 is decided by the range of the touch location on the light guide plate to be detected by the first sensor unit 104 and the second sensor unit 106, and the positions of the first sensor unit 104 and the second sensor unit 106.

In addition, as shown in the broken line 680 of FIG. 30, the corner of the light guide plate 602 may be provided with the arc-shaped curved surface 630 or the slope 640. The broken line 680 indicates the short side of the light guide plate 602 where the arc-shaped curved surface 630 is formed at the corner. At this time, the central angle of the arc of the arc-shaped curved surface 630 may be larger than 90°. Similarly, when the corner of the light guide plate 602 is provided with the slope 640, the central angle of the outer arc-shaped curved surface 642 may be larger than 90°.

The position of the sensor unit to the light guide plate 602, i.e. the position of the arc-shaped curved surface 630 or the slope 640 on the light guide plate 602 should not be limited to the corner of the light guide plate 602 or its adjacency. The arc-shaped curved surface 630 or the slope 640 may be positioned at the central portion of a long side or a short side of the light guide plate 602. In this case, preferably, the central angle of the arc of the arc-shaped curved surface 630 or the outer arc-shaped curve 642 is about 180°.

In the fifth embodiment, it is explained that the first reflection plate 650 and the second reflection plate 652, or the third reflection plate 654 and the fourth reflection plate 656 are provided, but it should not be limited to this. For example, the first reflection plate 650 or the third reflection plate 654 only may be provided. In this case, it is possible that the light is prevented from emitting to the upside of the light guide plate 602 from the slope 640. Otherwise, the second reflection plate 652 or the fourth reflection plate 656 only may be provided. In this case, it is possible that the light is prevented from emitting from the rear surface 626 of the light guide plate 602.

In the first-sixth embodiments, it is explained that the lens unit 120 comprises an f-θ lens, but they should not be limited to this. It is possible that the lens is one that the incident angle θ of the light corresponds to the detecting point of the light by the sensor (a distance A from the center of the sensor) at 1:1. It is possible that the relation between the incident angle θ and the detecting point Δ is non-linear. When the characteristics of the adapted lens (the relation between θ and Δ) are preliminarily stored as a table or function, the incident angle θ of the light can be calculated on the basis of the detecting point Δ.

In the first-sixth embodiments, the lens unit 120 of each of sensors may be provided with an iris (iris system). By providing the iris, the contour of the light incident on the sensor can be further clarified to further improve the detection deficiency.

In the first-sixth embodiments, each of the sensors should not be limited to a line sensor and may be possible to be a two-dimensional sensor.

In the first-sixth embodiments, the band-pass filter may not be provided so long as the sensor can distinguish the scattered light emitted from the light source unit or the light emitted from the LED pen, from the background light at a distinct level from the noise level of the background light.

In the first-sixth embodiments, the pen incorporating the LED element is exemplified. However, the light source incorporated into the pen may be a laser, organic EL element, or the like, other than the LED element. A semi-transparent silicone rubber or the like may be provided at the tip of the pen to prevent damage of the light guide plate by the touch of the pen, to generate the scatter light by the touch of the pen, and to avoid the pen's scratches, etc.

Example 1

The effectiveness of the invention according to the fourth-sixth embodiments is demonstrated by showing experimental results. An experiment was performed to prove that a difference in the shapes of the edges of the light guide plate 602 facing the sensor unit causes a difference in focusing the scattered light. Specifically, the following three-kinds of the shapes of the edges of the light guide plate were prepared: (a) flat edges which were not worked; (b) the arc-shaped curved surfaces as shown in FIGS. 18-19; and (c) the slope as shown in FIG. 24 (R5=0, t3=0))

A camera was prepared which comprised a CMOS sensor and an infrared band-pass filter. The light source was an infrared source of 850 nm. Under the condition that the LED element was attached to the surface of the light guide plate, each of the edges of the light guide plate was photographed. FIG. 31 shows the experimental results. FIG. 31 (a)-(c) correspond to the shapes of the edges in the three examples (a)-(c), respectively.

Comparing the three results of FIG. 31 (a)-(c) with each other, in FIG. 31 (a) the flat edges, the light was vague. Both at the edge having (b) the arc-shaped curved surfaces as shown in FIGS. 18-19, and (c) the slope as shown in FIG. 24, in FIGS. 31 (b) and (c), the width of the light was thinner and sharper than the case of FIG. 31 (a) the flat edges. At the edge having (c) the slope as shown in FIG. 24, in FIG. 31 (c), the width of the light was thinner and sharper at the downside of the slope (see an arrow with "light from the pen's tip").

This invention may be embodied in other specific forms without departing from the spirit or essential characteristics thereof. The embodiments of the present invention are therefore to be considered in all respects as illustrative and not restrictive, since the scope of the invention is defined by the appended claims, with reference to the detailed description of the invention, rather than by the foregoing description, and all changes which fall within the meaning and range of equivalency of the claims are therefore intended to be embraced by the claims.

INDUSTRIAL APPLICABILITY

According to the present invention, the touch panel device can be provided which enables the detection precision of the touch location to be improved by increasing the strength of the detection light detected by the detecting member, and producing the light of which the contour is clarified.

EXPLANATION OF REFERENCE NUMERALS 100, 600 touch panel device
102, 602 light guide plate
104 first sensor unit
106 second sensor unit
108 light source unit
110 LED array unit
112 triangular prism
114 sensor control unit
116 light source control unit
118 primary control unit
120 lens unit
122 band-pass filter
124 sensor
126 optical detecting plate
128 rear surface of the optical detecting plate
130 inner arc-shaped curved surface
132, 146, 632, 646 axis
134 outer arc-shaped curved surface
140, 640 slope
142 outer arc-shaped curve
144 inner arc-shaped curve
150 reflection plate
170 optical joint portion
172 cover
174 gap
200 display panel
202 display control unit
204 host device
220 finger
222 LED pen
626 rear surface
630 arc-shaped curved surface
642 outer arc-shaped curve
644, 648 inner arc-shaped curve
650 first reflection plate
652 second reflection plate
654 third reflection plate
656 fourth reflection plate

What is claimed is:

1. An optical sensor comprising:
a detector that detects light;
a flat optic that guides scattered light or incoming light to the detector, the scattered light occurs from light transmitted inside a flat light guide, and the scattered light is started to be transmitted inside the flat light guide and propagates through the flat light guide when a first input object touches a surface of the flat light guide where the light is transmitted therein; and the incoming light occurs when a second input object touches the surface of the flat light guide and emits light into the flat light guide, and
a horseshoe-shaped optical detecting plate joined to the flat optic and including an arc-shaped curved side edge surface in a section and the arc-shaped curved side edge surface faces the detector, wherein
the detector outputs, as information relating to the light which is detected by the detector, location information of the first or the second input object corresponding to an incident angle on the detector of the light which is transmitted through the arc-shaped curved side edge surface and radiated from the facing arc-shaped curved side edge surface to the detector, and the arc-shaped curved side edge surface includes a first slope which is oblique to a flat plane of the flat optic.

2. The optical sensor according to claim 1, wherein an angle of inclination of the first slope to the flat plane of the flat optic is 10° or more and 40° or less.

3. The optical sensor according to claim 1, wherein the detector includes a lens and a sensor, wherein
the lens is separated from the arc-shaped curved side edge surface, and
the lens is provided to guide the light radiated from the arc-shaped curved side edge surface to a position on the sensor corresponding to each of incident angles of the light on the detector.

4. A touch panel device comprising:
a flat light guide that propagates light;
at least two optical sensors respectively positioned at edges of a rear surface of the flat light guide; and
a controller that computes a touch location upon the flat light guide, wherein
each optical sensor of the at least two optical sensors includes:
a detector that detects light,
a flat optic that guides to the detector scattered light or incoming light, the scattered light occurs from light transmitted inside the flat light guide, and the scattered light is started to be transmitted inside the flat light guide and propagates through the flat light guide when a first input object touches a surface of the flat light guide; and the incoming light occurs when a second input object touches the surface of the flat light guide and emits light into the flat light guide, and
a horseshoe-shaped optical detecting plate joined to the flat optic and including an arc-shaped curved side edge surface in a section and the arc-shaped curved side edge surface faces the detector,
the detector outputs, as information relating to the light which is detected by the detector, location information of the first or the second input object corresponding to an incident angle on the detector of the light which is transmitted through the arc-shaped curved side edge surface and radiated from the facing arc-shaped curved side edge surface to the detector, and
the controller computes the touch location upon the flat light guide by the first or the second input object on a basis of the information relating to the light.

5. The touch panel device according to claim 4, wherein the flat optic is joined to the flat light guide.

6. The touch panel device according to claim 4, further comprising a first reflection material arranged on a region on the surface of the flat light guide corresponding to a position of the flat optic.

7. The touch panel device according to claim 4, further comprising a cover arranged so there is a gap between a rear surface of the flat optic and the cover.

8. A touch panel device comprising:
a flat light guide that propagates light;
at least two optical sensors respectively positioned at edges of the flat light guide; and
a controller that computes a touch location upon the flat light guide, wherein
each optical sensor of the at least two optical sensors includes:
a detector that detects light,
a flat optic that guides to the detector scattered light or incoming light, the scattered light occurs from light transmitted inside the flat light guide, and the scattered light is started to be transmitted inside the flat light guide and propagates through the flat light guide when a first input object touches a surface of the flat light guide; and the incoming light occurs when a second input object touches the surface of the flat light guide and emits light into the flat light guide, and
a horseshoe-shaped optical detecting plate joined to the flat optic and including an arc-shaped curved side edge surface in a section and the arc-shaped curved side edge surface faces the detector,
the detector outputs, as information relating to the light which is detected by the detector, location information of the first or the second input object corresponding to an incident angle on the detector of the light which is transmitted through the arc-shaped curved side edge surface and radiated from the facing arc-shaped curved side edge surface to the detector,
the controller computes the touch location upon the flat light guide by the first or the second input object on a basis of the information relating to the light, and
the arc-shaped curved side edge surface includes a second slope which is oblique to a flat plane of the flat optic.

9. The touch panel device according to claim 8, further comprising a second reflection material adjacent to the second slope to reflect the light propagating through the inside of the flat light guide.

10. The touch panel device according to claim 8, further comprising a third reflection material facing the second slope at a rear surface of the flat optic to reflect the light propagating through the inside of the flat light guide.

11. The touch panel device according to claim 8, further comprising a second arc-shaped curved side edge surface which is vertical to a rear surface of the flat optic, positioned at a minimum distance between the second slope and the rear surface of the flat optic and defined to be continuous with the second slope.

12. The touch panel device according to claim 11, further comprising a fourth reflection material adjacent to an entire surface of the second slope to reflect the light propagating through the inside of the flat light guide.

13. The touch panel device according to claim 8, further comprising a fifth reflection material facing the second slope at a rear surface of the flat optic to reflect the light propagating through the inside of the flat light guide.

14. The touch panel device according to claim 8, wherein an angle of inclination of the second slope to the flat plane of the flat optic is 10° or more and 40° or less.

* * * * *